US012562006B2

(12) United States Patent     (10) Patent No.:   US 12,562,006 B2
Tanzer et al.                  (45) Date of Patent:     Feb. 24, 2026

(54) SYSTEM(S) AND METHOD(S) FOR TRAINING A SIGN LANGUAGE CAPTIONING MODEL AND SUBSEQUENT USE THEREOF

(71) Applicant: GOOGLE LLC, Mountain View, CA (US)

(72) Inventors: Garrett Tanzer, Boston, MA (US); Sepehr Sam Sepah, Pleasanton, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/787,620

(22) Filed: Jul. 29, 2024

(65) Prior Publication Data

US 2025/0384717 A1     Dec. 18, 2025

Related U.S. Application Data

(60) Provisional application No. 63/660,284, filed on Jun. 14, 2024.

(51) Int. Cl.
   *G06V 40/20*        (2022.01)
   *G06N 3/08*         (2023.01)
              (Continued)

(52) U.S. Cl.
   CPC ............. *G06V 40/28* (2022.01); *G06N 3/08* (2013.01); *G09B 21/009* (2013.01); *H04N 21/4884* (2013.01)

(58) Field of Classification Search
   CPC ............. H04N 21/4884; G09B 21/009; G06V 40/28; G06N 3/08
   See application file for complete search history.

(56) References Cited

U.S. PATENT DOCUMENTS 10,268,879 B2 *   4/2019   Mahmoud .............. G06V 40/28
10,289,903 B1 *   5/2019   Chandler ............... G06N 20/00
                 (Continued)

OTHER PUBLICATIONS

Anthropic; "The Claude 3 Model Family: Opus, Sonnet, Haiku"; retrieved from internet at URL https://www-cdn.anthropic.com/de8ba9b01c9ab7cbabf5c33b80b7bbc618857627/Model_Card_Claude_3.pdf; 42 pages; dated 2024.
                 (Continued)

*Primary Examiner* — John R Schnurr
(74) *Attorney, Agent, or Firm* — Gray Ice Higdon

(57)            ABSTRACT

Implementations are directed to training and subsequently utilizing a sign language captioning model. Initially, processor(s) of a system can obtain a plurality of training instances that are generated based on processing sign language video content, sign language conversations, etc. Each of the plurality of training instances can include at least corresponding sign language feature tokens for a sign language video content segment, ground truth caption tokens associated with ground truth sign language captions for the sign language video content segment and ground truth timestamp tokens that align the ground truth sign language captions with respect to the sign language video content segment. Further, the processor(s), can train the sign language captioning model based on the plurality of training instances, and can cause the sign language captioning model to be deployed in an offline manner and/or in an online manner for processing sign language content.

19 Claims, 9 Drawing Sheets

(51) Int. Cl.
*G09B 21/00* (2006.01)
*H04N 21/488* (2011.01)

(56) References Cited

U.S. PATENT DOCUMENTS

| | | | | |
|---|---|---|---|---|
| 11,263,409 | B2 * | 3/2022 | Zhang | G06N 3/0442 |
| 11,741,755 | B2 * | 8/2023 | Ko | G06N 3/084 |
| | | | | 382/100 |
| 2019/0130176 | A1 * | 5/2019 | Maxwell | G06V 40/28 |
| 2020/0005028 | A1 * | 1/2020 | Gu | G10L 13/00 |
| 2022/0139417 | A1 * | 5/2022 | Maxwell | H04N 7/15 |
| | | | | 704/235 |
| 2022/0327309 | A1 * | 10/2022 | Carlock | G09B 21/009 |
| 2022/0327961 | A1 * | 10/2022 | Kelly | G09B 21/04 |
| 2022/0391612 | A1 * | 12/2022 | Chakrabarty | G06N 3/08 |
| 2023/0290371 | A1 * | 9/2023 | Jawahar | G10L 25/30 |
| 2024/0233745 | A1 * | 7/2024 | Maxwell | G06T 13/40 |
| 2024/0320449 | A1 * | 9/2024 | Kumar | G06V 40/28 |
| 2025/0078574 | A1 * | 3/2025 | Thomson | G06F 40/58 |
| 2025/0078818 | A1 * | 3/2025 | Sridhar | G06N 3/047 |
| 2025/0165722 | A1 * | 5/2025 | Thomson | G09B 21/009 |
| 2025/0165730 | A1 * | 5/2025 | Thomson | G10L 15/16 |
| 2025/0201263 | A1 * | 6/2025 | Maxwell | H04N 7/147 |

OTHER PUBLICATIONS

Bandarkar, L. et al., "The Belebele Benchmark: A Parallel Reading Comprehension Dataset in 122 Language Variants"; arXiv.org, Cornell University; arXiv:2308.16884v1; 25 pages; dated Aug. 31, 2023.

Conneau, A. et al., "FLEURS: Few-shot Learning Evaluation of Universal Representations of Speech"; arXiv.org, Cornell University; arXiv:2205.12446v1; 10 pages; dated May 25, 2022.

Desai, A. et al., "Systemic Biases in Sign Language AI Research: A Deaf-Led Call to Reevaluate Research Agendas"; arXiv.org, Cornell University; arXiv:2403.02563v1; 12 pages; dated Mar. 5, 2024.

Duarte, A. et al., "How2Sign: A Large-scale Multimodal Dataset for Continuous American Sign Language"; in Proceedings of the IEEE/CVF Conference on Computer Vision and Pattern Recognition (CVPR); pp. 2735-2744; dated 2021.

Goyal, N. et al., "The FLORES-101 Evaluation Benchmark for Low-Resource and Multilingual Machine Translation"; arXiv.org, Cornell University; arXiv:2106.03193v1; 26 pages; dated Jun. 6, 2021.

Grishchenko, I. et al., "MediaPipe Holistic—Simultaneous Face, Hand and Pose Prediction, on Device"; retrieved from the internet: URL https://ai.googleblog.com/2020/12/mediapipe-holistic-simultaneous-face.html; 6 pages; dated Dec. 2020.

Guzmán, F. et al., "Two New Evaluation Datasets for Low-Resource Machine Translation: Nepali-English and Sinhala-English"; arXiv.org, Cornell University; arXiv:1902.01382v1; 13 pages; dated Feb. 4, 2019.

Lugaresi, C. et al., "MediaPipe: A Framework for Building Perception Pipelines"; arXiv.org, Cornell University; arXiv:1906.08172v1; 9 pages; dated Jun. 14, 2019.

NLLB Team; "No Language Left Behind: Scaling Human-Centered Machine Translation"; arXiv.org, Cornell University; arXiv:2207.04672; 192 pages; dated Aug. 25, 2022.

OpenAI; "Hello Gpt-4o"; retrieved from the internet: URL https://openai.com/index/hello-gpt-40/; 19 pages; dated May 13, 2024.

Radford, A. et al., "Robust Speech Recognition via Large-Scale Weak Supervision"; arXiv.org, Cornell University; arXiv:2212.04356v1; 28 pages; dated Dec. 6, 2022.

Raffel, C. et al., "Exploring the Limits of Transfer Learning with a Unified Text-to-Text Transformer"; Journal of Machine Learning Research; 67 pages; dated Jun. 2020.

Sellam, T. et al., "BLEURT: Learning Robust Metrics for Text Generation"; arXiv.org, Cornell University; arXiv:2004-04696; 12 pages; dated May 21, 2020.

Sincan, O.M. et al., "Is context all you need? Scaling Neural Sign Language Translation to Large Domains of Discourse"; Proceedings of the IEEE/CVF International Conference on Computer Vision (ICCV); pp. 1955-1965; dated 2023.

Tanzer, G. et al., "Reconsidering Sentence-Level Sign Language Translation"; arXiv.org, Cornell University; arXiv:2406.11049; 26 pages; dated Jun. 16, 2024.

Gemini Team; "Gemini 1.5: Unlocking multimodal understanding across millions of tokens of context"; arXiv.org, Cornell University; arXiv:2403.05530; 154 pages; dated Jun. 14, 2024.

Uthus, D. et al., "Youtube-ASL: A Large-Scale, Open-Domain American Sign Language-English Parallel Corpus"; Conference on Neural Information Processing Systems (NeurIPS); 19 pages; dated 2023.

Yin, K. et al., "Including Signed Languages in Natural Language Processing"; In Proceedings of the 59th Annual Meeting of the Association for Computational Linguistics and the 11th International Joint Conference on Natural Language Processing; pp. 7347-7360; dated Aug. 2021.

Zhang, B. et al., "SLTUnet: A Simple Unified Model for Sign Language Translation"; in the 11th International Conference on Learning Representations; 18 pages; dated 2023.

* cited by examiner

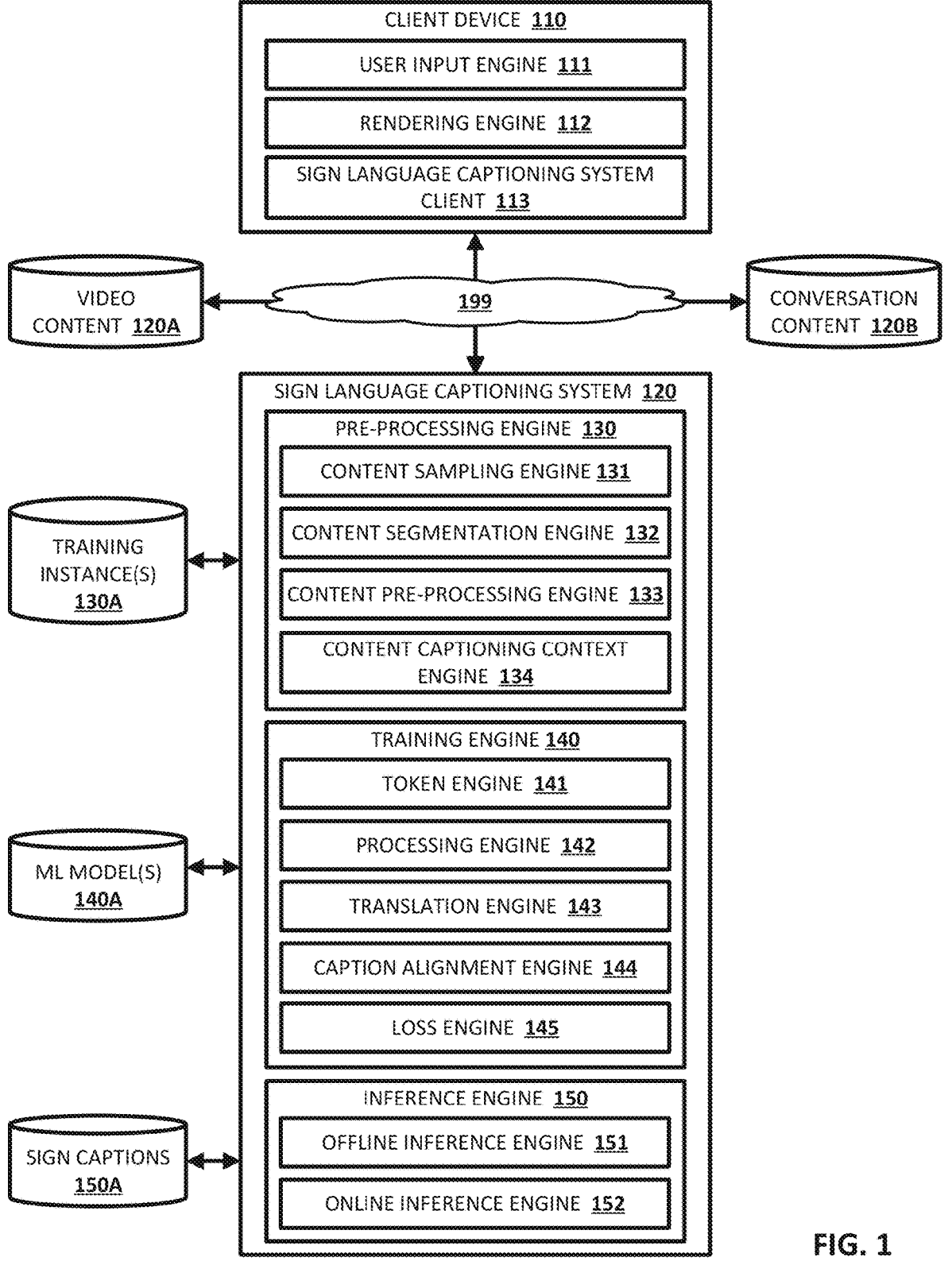

CLIENT DEVICE 110

USER INPUT ENGINE 111

RENDERING ENGINE 112

SIGN LANGUAGE CAPTIONING SYSTEM CLIENT 113

VIDEO CONTENT 120A

199

CONVERSATION CONTENT 120B

SIGN LANGUAGE CAPTIONING SYSTEM 120

PRE-PROCESSING ENGINE 130

CONTENT SAMPLING ENGINE 131

CONTENT SEGMENTATION ENGINE 132

CONTENT PRE-PROCESSING ENGINE 133

CONTENT CAPTIONING CONTEXT ENGINE 134

TRAINING INSTANCE(S) 130A

TRAINING ENGINE 140

TOKEN ENGINE 141

PROCESSING ENGINE 142

TRANSLATION ENGINE 143

CAPTION ALIGNMENT ENGINE 144

LOSS ENGINE 145

ML MODEL(S) 140A

INFERENCE ENGINE 150

OFFLINE INFERENCE ENGINE 151

ONLINE INFERENCE ENGINE 152

SIGN CAPTIONS 150A

FIG. 1

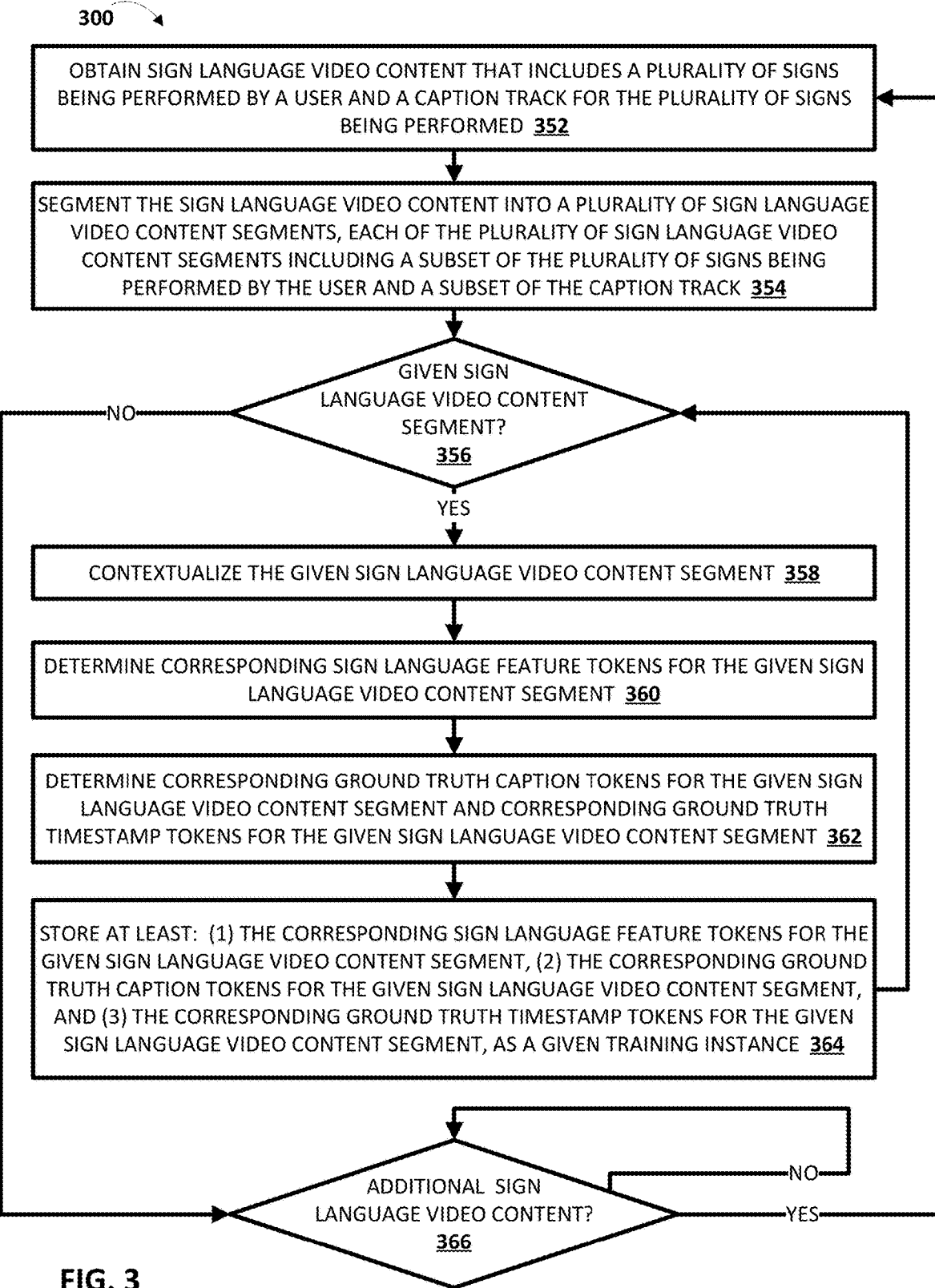

300

OBTAIN SIGN LANGUAGE VIDEO CONTENT THAT INCLUDES A PLURALITY OF SIGNS BEING PERFORMED BY A USER AND A CAPTION TRACK FOR THE PLURALITY OF SIGNS BEING PERFORMED 352

SEGMENT THE SIGN LANGUAGE VIDEO CONTENT INTO A PLURALITY OF SIGN LANGUAGE VIDEO CONTENT SEGMENTS, EACH OF THE PLURALITY OF SIGN LANGUAGE VIDEO CONTENT SEGMENTS INCLUDING A SUBSET OF THE PLURALITY OF SIGNS BEING PERFORMED BY THE USER AND A SUBSET OF THE CAPTION TRACK 354

GIVEN SIGN LANGUAGE VIDEO CONTENT SEGMENT? 356

NO

YES

CONTEXTUALIZE THE GIVEN SIGN LANGUAGE VIDEO CONTENT SEGMENT 358

DETERMINE CORRESPONDING SIGN LANGUAGE FEATURE TOKENS FOR THE GIVEN SIGN LANGUAGE VIDEO CONTENT SEGMENT 360

DETERMINE CORRESPONDING GROUND TRUTH CAPTION TOKENS FOR THE GIVEN SIGN LANGUAGE VIDEO CONTENT SEGMENT AND CORRESPONDING GROUND TRUTH TIMESTAMP TOKENS FOR THE GIVEN SIGN LANGUAGE VIDEO CONTENT SEGMENT 362

STORE AT LEAST: (1) THE CORRESPONDING SIGN LANGUAGE FEATURE TOKENS FOR THE GIVEN SIGN LANGUAGE VIDEO CONTENT SEGMENT, (2) THE CORRESPONDING GROUND TRUTH CAPTION TOKENS FOR THE GIVEN SIGN LANGUAGE VIDEO CONTENT SEGMENT, AND (3) THE CORRESPONDING GROUND TRUTH TIMESTAMP TOKENS FOR THE GIVEN SIGN LANGUAGE VIDEO CONTENT SEGMENT, AS A GIVEN TRAINING INSTANCE 364

ADDITIONAL SIGN LANGUAGE VIDEO CONTENT? 366

NO

YES

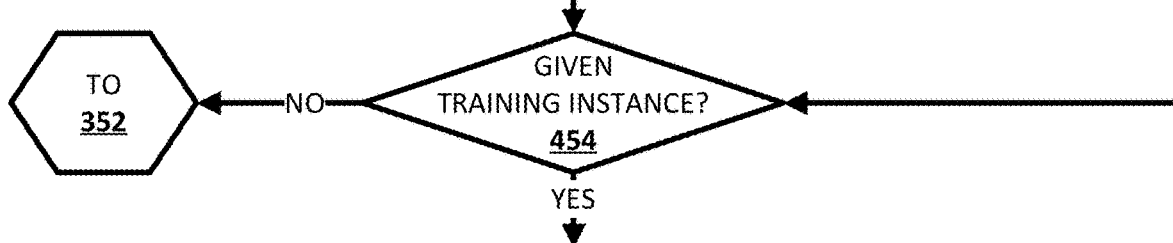

OBTAIN A PLURALITY OF TRAINING INSTANCES FOR TRAINING A SIGN LANGUAGE CAPTIONING MODEL, EACH OF THE PLURALITY OF TRAINING INSTANCES INCLUDING A CORRESPONDING TRAINING INSTANCE INPUT AND A CORRESPONDING TRAINING INSTANCE OUTPUT __452__

TO __352__ ←—NO— GIVEN TRAINING INSTANCE? __454__

YES

PROCESS, USING THE SIGN LANGUAGE CAPTIONING MODEL, AT LEAST CORRESPONDING SIGN LANGUAGE FEATURE TOKENS FOR A SIGN LANGUGAE VIDEO CONTENT SEGMENT, INCLUDED IN THE CORRESPONDING TRAINING INSTANCE INPUT OF THE GIVEN TRAINING INSTANCE, TO GENERATE SIGN LANGUAGE CAPTIONING MODEL OUTPUT __456__

DETERMINE, BASED ON THE SIGN LANGUAGE CAPTIONING MODEL OUTPUT, PREDICTED CAPTION TOKENS ASSOCIATED WITH PREDICTED SIGN LANGUAGE CAPTIONS FOR THE SIGN LANGUGAE VIDEO CONTENT SEGMENT AND PREDICTED TIMESTAMP TOKENS THAT ARE PREDICTED TO ALIGN THE PREDICTED SIGN LANGUAGE CAPTIONS WITH THE SIGN LANGUGAE VIDEO CONTENT SEGMENT __458__

GENERATE, BASED ON A COMPARISON OF: (1) THE PREDICTED CAPTION TOKENS AND GROUND TRUTH CAPTION TOKENS, INCLUDED IN THE CORRESPONDING TRAINING INSTANCE OUTPUT OF THE GIVEN TRAINING INSTANCE, AND/OR (2) THE PREDICTED TIMESTAMP TOKENS AND GROUND TRUTH TIMESTAMP TOKENS, INCLUDED IN THE CORRESPONDING TRAINING INSTANCE OUTPUT OF THE GIVEN TRAINING INSTANCE, LOSS(ES) __460__

UPDATE, BASED ON THE LOSS(ES), THE SIGN LANGUAGE CAPTIONING MODEL __462__

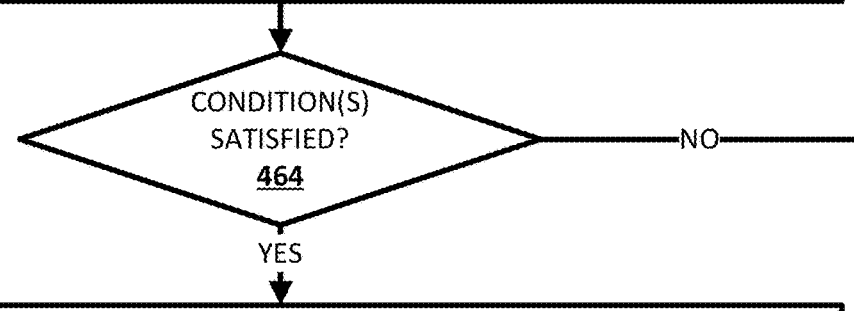

CONDITION(S) SATISFIED? __464__ —NO—

YES

CAUSE THE SIGN LANGUAGE CAPTIONING MODEL TO BE DEPLOYED __466__

FIG. 4

SYSTEM(S) AND METHOD(S) FOR TRAINING A SIGN LANGUAGE CAPTIONING MODEL AND SUBSEQUENT USE THEREOF

BACKGROUND

Humans' (also referred to herein as "users") abilities to interact with other humans and/or to interact with machines (such as interactive software applications referred to herein as "automated assistants") can sometimes be dependent upon whether they have any conditions that impact communication of information. For example, certain users may have completely diminished or partially diminished hearing, and/or may rely upon sign language or other inaudible communications techniques in their daily lives. As a result, these users' opportunities to interact with other humans may be limited by other users' understanding of sign language and/or to interact with machines may be limited to directly contacting a touch interface of a display. With respect to human interactions, this can be in part because of a lack of real-time translation capabilities of sign language for users who do not understand sign language, and a lack of real-time alignment of the sign language with a translation thereof. With respect to machine interactions, this can be in part because certain assistant-enabled devices may exclusively rely on a microphone to detect an invocation phrase or the like, rather than providing any other means for receiving an inaudible invocation command, and may also lack real-time translation capabilities of sign language, and a lack of real-time alignment of the sign language with a translation thereof.

SUMMARY

Implementations described herein are directed to training and subsequently utilizing a sign language captioning model. Initially, processor(s) of a system can obtain a plurality of training instances that each include a corresponding training instance input and a corresponding training instance output. For instance, the processor(s) can generate the plurality of training instances based on processing sign language video content, sign language conversations, etc. as described herein, and can store the plurality of training instances in one or more databases for subsequent utilization in training the sign language captioning model. The corresponding training instance input, for each of the plurality of training instances, can include at least corresponding sign language feature tokens for a sign language video content segment (e.g., a corresponding video embedding for the sign language video content segment, corresponding image embeddings for the sign language video content segment, corresponding vectors for skeletonized versions of the sign language video content segment, etc.). Further, the corresponding training instance output, for each of the plurality of training instances, can include ground truth caption tokens associated with ground truth sign language captions for the sign language video content segment (e.g., representing characters, word chunks, words, etc. that correspond to a translation of sign language captured in the sign language video content segment) and ground truth timestamp tokens that align the ground truth sign language captions with respect to the sign language video content segment (e.g., representing where the ground truth captions should be rendered with respect to the sign language captured in the sign language video content segment). Subsequently, the processor(s), can train the sign language captioning model based on the plurality of training instances, and can cause the sign language captioning model to be deployed in an offline manner and/or in an online manner for processing sign language content.

In some implementations, and in generating the plurality of training instances, the processor(s) can obtain sign language video content that includes a plurality of signs being performed by a user (e.g., as part of uploaded content, as part of a conversation between a user and an automated assistant, as part of a conversation between multiple users, etc.) and a caption track for the plurality of signs being performed by the user (e.g., a translation of the plurality of signs provided as captions as the user signs and timestamps that align the translation of the plurality of signs with movements corresponding to the plurality of signs). In some versions of those implementations, the caption track can be manually provided by a human reviewer as annotations, semi-automatically provided by machine translation along with human feedback of the machine translation, or by other means. Further, the processor(s) can segment the sign language video content into a plurality of sign language video content segments that each include a corresponding subset of the plurality of signs being performed by the user and a corresponding subset of the caption track for the plurality of signs being performed by the user. Moreover, and based on processing the plurality of sign language video content segments (e.g., using an image encoder to generate one or more corresponding image embeddings for each of the plurality of sign language video content segments, a video encoder to generate a corresponding video embedding for each of the sign language video content segments, Media-Pipe Holistic to generate corresponding skeletonized versions (or other landmark versions) for each of the sign language video content segments, etc.), the processor(s) can determine the corresponding sign language feature tokens for each of the sign language video content segments and for utilization as the corresponding training instance inputs. Furthermore, and based on processing the corresponding subsets of the plurality of signs being performed by the user and the corresponding subsets of the caption tracks for the plurality of signs being performed by the user (e.g., using a text encoder, etc.), the processor(s) can determine the corresponding ground truth caption tokens and the ground truth timestamp tokens that align the ground truth sign language captions with respect to the sign language video content segment and for utilization as the corresponding training instance outputs.

For example, assume that the processor(s) have access to a repository of sign language video content that is accessible by a plurality of users (e.g., YouTube-ASL or another repository of sign language video content) and that includes corresponding caption tracks. In this example, the processor(s) can obtain given sign language video content and can segment the given sign language video content into n segments (where n is a positive integer or number greater than one), such that the given sign language video content is segmented into a plurality of sign language video content segments of fixed or arbitrary lengths. In this example, the processor(s) can process the plurality of sign language video content segments to determine the corresponding sign language feature tokens for each of the plurality of sign language video content segments, and can process subsets of the corresponding caption tracks to determine the corresponding ground truth caption tokens and the ground truth timestamp tokens that align the ground truth sign language captions with respect to the sign language video content segment. Further, in this example, the corresponding caption tracks for one or more instances of the sign language video content may be misaligned since they may have been previously aligned with a speech track that was provided for the sign language video content rather than a plurality of signs that are actually captured in the sign language video content.

Although the above example is described with respect to the processor(s) accessing the repository of sign language video content to generate the plurality of training instances, it should be understood that is for the sake of example and is not meant to be limiting. Rather, it should be understood that other data repositories may be available. For example, the processor(s) can have access to a repository of conversations between a user and an automated assistant, where the user interacts with the automated assistant in sign language, and that includes corresponding transcriptions for the conversations (e.g., as the corresponding caption track for the conversations). In this example, the processor(s) can obtain dialog history for a given conversation, segment given sign language video content from the dialog history for the given conversation into n segments (where n is a positive integer or number greater than one), and process this content in the same or similar manner described above to generate the plurality of training instances. Also, for example, the processor(s) can have access to a repository of conversations between multiple users (e.g., in-person conversations or virtual conversations (e.g., during a video conference)), where at least one of the users interacts with in sign language, and that includes corresponding transcriptions for the conversations (e.g., as the corresponding caption track for the conversations). In this example, the processor(s) can obtain dialog history for a given conversation, segment given sign language video content from the dialog history for the given conversation into n segments (where n is a positive integer or number greater than one), and process this content in the same or similar manner described above to generate the plurality of training instances.

In some versions of those implementations, and in generating the plurality of training instances, the processor(s) can contextualize each of the plurality of training instances, which may vary based on the content being processed to generate the plurality of training instances. Continuing with the above example where the processor(s) have access to the repository of the sign language video content that is accessible by the plurality of users, each of the plurality of sign language video content segments may include m seconds of sign language video content (where m is a positive integer or number) and the corresponding sign language feature tokens may represent features for m-a seconds and/or m+a seconds (where a is a positive number of integer less than m). Similarly, the corresponding ground truth caption tokens and the ground truth timestamp tokens may represent captions and timestamps for m-a seconds and/or m+a seconds from the corresponding caption track. Continuing with the above example where the processor(s) have access to the repository of conversations between the user and the automated assistant, the corresponding sign language feature tokens may be supplemented with features for m−a seconds and/or m+a seconds (where a is a positive integer or number less than m) of the user signing as described above. Further, the corresponding ground truth caption tokens and the ground truth timestamp tokens may be supplemented with additional content from prior and/or next turns of the dialog (e.g., prior queries submitted by the user to the automated assistant, prior responses output by the automated assistant, next queries submitted by the user to the automated assistant, next responses output by the automated assistant, etc.).

Continuing with the above example where the processor(s) have access to the repository of conversations between the multiple users, the corresponding sign language feature tokens may be supplemented with features for m−a seconds and/or m+a seconds (where a is a positive integer or number less than m) of the user signing as described above. Further, the corresponding ground truth caption tokens and the ground truth timestamp tokens may be supplemented with additional content from prior and/or next turns of the dialog (e.g., prior dialog turns signed by the user, prior dialog turns by one or more additional participants in the conversation, next dialog turns signed by the user, next dialog turns by one or more additional participants in the conversation, etc.).

In some implementations, and in processing a given training instance from among the plurality of training instances, the processor(s) can process, using the sign language captioning model, the corresponding training instance input (e.g., at least the corresponding sign language feature tokens for the sign language video content segment) to generate sign language captioning model output. Further, the processor(s) can determine, based on the sign language captioning model output, predicted caption tokens associated with predicted sign language captions for the sign language video content segment and predicted timestamp tokens that are predicted to align the predicted sign language captions with respect to the sign language video content segment. Accordingly, the processor(s) can utilize supervised learning techniques to generate one or more losses for updating the sign language captioning model and based on a comparison of (i) the predicted caption tokens and the ground truth caption tokens, and/or (ii) the predicted timestamp tokens and the ground truth timestamp tokens, and update the sign language captioning model based on the one or more losses. Although supervised learning techniques are described herein, it should be understood that other learning techniques (e.g., semi-supervised learning via a student-teacher approach) are also contemplated herein.

In some implementations, the corresponding training instance inputs may further include instructions related to a task to be performed by the sign language captioning model. For example, the instructions can instruct the sign language captioning model to generate the predicted caption tokens and/or the predicted timestamp tokens and based on processing at least the corresponding sign language feature tokens for the sign language video content segment. In some versions of those implementations, the instructions can further specify a length of the predicted captions in terms of text spans for how many terms or phrases should be included in each of the predicted captions. For example, the instructions can instruct the sign language captioning model to use separator tokens or the like (e.g., represented by a token of '<null>', \n', or the like) to determine the predicted captions according to a fixed length or over a fixed duration of time and/or to determine the predicted captions according a dynamic length or over a dynamic duration of time. In additional or alternative versions of those implementations, the instructions can instruct the sign language captioning model to determine a predicted language of the plurality of signs captured in the sign language video content segment, such as American Sign Language, British Sign Language, Japanese Sign Language, Chinese Sign Language, etc. In these examples, the corresponding training instance outputs may further include a ground truth language token that can be compared to a predicted language token, which can be further utilized in generating the one or more losses.

In some implementations, the corresponding training instance inputs may further include an indication of whether the captions are well-aligned or misaligned. For example, if the given sign language video content is misaligned with the corresponding caption track based on it being previously aligned with a speech track that was provided for the sign language video content rather than a plurality of signs that are actually captured in the sign language video content, then the corresponding training instance inputs may further include a control token that indicates these training instances are noisy. However, if the given sign language video content is well-aligned with the corresponding caption track based on it being previously aligned with the plurality of signs that are actually captured in the sign language video content, then the corresponding training instance inputs may further include a control token that indicates these training instances are clean. Accordingly, in implementations where the sign language captioning model is subsequently trained based on these training instances that include the indication of whether the captions are well-aligned or misaligned, the sign language captioning model can better align predicted captions with signs at inference.

In some implementations, the processor(s) can cause the sign language captioning model to be deployed in response to determining that one or more conditions are satisfied. The one or more conditions can include, for example, whether the sign language captioning model has been updated based on a threshold quantity of training instances, whether performance of the sign language captioning model satisfies a threshold quality of performance, and/or other conditions. Put another way, the processor(s) may only cause the sign language captioning model to be deployed in response to determining that some acceptable baseline level of performance will be achieved at inference.

In some implementations, and in causing the sign language captioning model to be deployed, the processor(s) can utilize the sign language captioning model in an offline manner and/or in an online manner by autoregressively processing sign language video content. In utilizing the sign language captioning model in the offline manner, the processor(s) can identify newly added sign language video content that is newly added to a repository of sign language video content or other video content (e.g., YouTube or other video content repositories), process, using the trained sign language captioning model, the newly added sign language video content to determine a timestamped caption track associated with the newly added sign language video content, and store, in association with the newly added sign language video content, the timestamped caption track. Accordingly, when the newly added sign language video content is subsequently consumed by various users, the timestamped caption track can be played back along with playback of the newly added sign language video content.

In some versions of those implementations where the sign language captioning model is utilized in the offline manner, a human reviewer may be in the loop. For example, the human reviewer can perform the translation of a plurality of signs included in the newly added sign language video content, but processor(s) can still utilize the trained sign language captioning model to generate the timestamped caption track for the newly added sign language video content, which is time-consuming and can be computationally intensive, thereby obviating concluding a human-to-machine interaction in a more quick and efficient manner. As another example, the processor(s) can utilize the trained sign language captioning model to perform the translation of a plurality of signs included in the newly added sign language video content and to generate the timestamped caption track for the newly added sign language video content, but the human reviewer can provide corrections with respect to the timestamped caption track (e.g., with respect to the captions themselves and/or with respect to the timestamps for the captions). In this example, not only can these corrections be utilized to update the timestamped caption track, but these corrections can also be utilized as a supervision signal to generate training instances for further training the trained sign captioning model.

In utilizing the sign language captioning model in the online manner, the processor(s) can identify an ongoing conversation between a given user of a client device and an automated assistant and/or an ongoing conversation between a given user and an additional user, process, using the trained sign language captioning model, vision data that captures a plurality of sign language signs of the given user and a dialog history of the ongoing conversation to determine a timestamped caption track associated with the ongoing conversation, and cause the timestamped caption track to be visually rendered throughout the ongoing conversation. In some versions of those implementation, the given user (or additional user(s) that is/are a participant in the conversation) can specify a caption duration over which the sign language captioning model will autoregress over the vision data that captures the plurality of sign language signs of the given user, thereby enabling the sign language captioning model to re-translate the plurality of sign language signs. For example, if the given user (or the additional user(s)) want streaming-like timestamped caption tracks, then the given user (or the additional user(s)) can specify a relatively short duration of time (e.g., 2 seconds, 4 seconds, or the like) to ensure the timestamped caption tracks is generated at a sign-level, word-level, etc. which, in turn, will reduce latency in causing portions of the timestamped caption track to be visually rendered. However, this may introduce some errors in the timestamped caption track in that the trained sign language captioning model is conditioned on relatively less vision data and relatively less context. As another example, if the given user (or the additional user(s)) is less concerned with streaming-like timestamped caption tracks, then the given user (or the additional user(s)) can specify a relatively longer duration of time (e.g., 10 seconds, 20 seconds, or the like) to ensure the timestamped caption tracks are generated at a phrase-level, sentence-level, etc. which, in turn, will increase latency in causing portions of the timestamped caption track to be visually rendered. However, this may obviate some errors in the timestamped caption track in that the trained sign language captioning model is conditioned on relatively more vision data and relatively more context.

The above description is provided as an overview of only some implementations disclosed herein. Those implementations, and other implementations, are described in additional detail herein.

BRIEF DESCRIPTION OF THE DRAWINGS

FIG. 1 depicts a block diagram of an example environment that demonstrates various aspects of the present disclosure, and in which implementations disclosed herein can be implemented.

FIG. 3 depicts a flowchart illustrating an example method of generating a plurality of training instances for training a sign language captioning model, in accordance with various implementations.

FIG. 4 depicts a flowchart illustrating an example method of training a sign language captioning model, in accordance with various implementations.

DETAILED DESCRIPTION

Figure 2A:
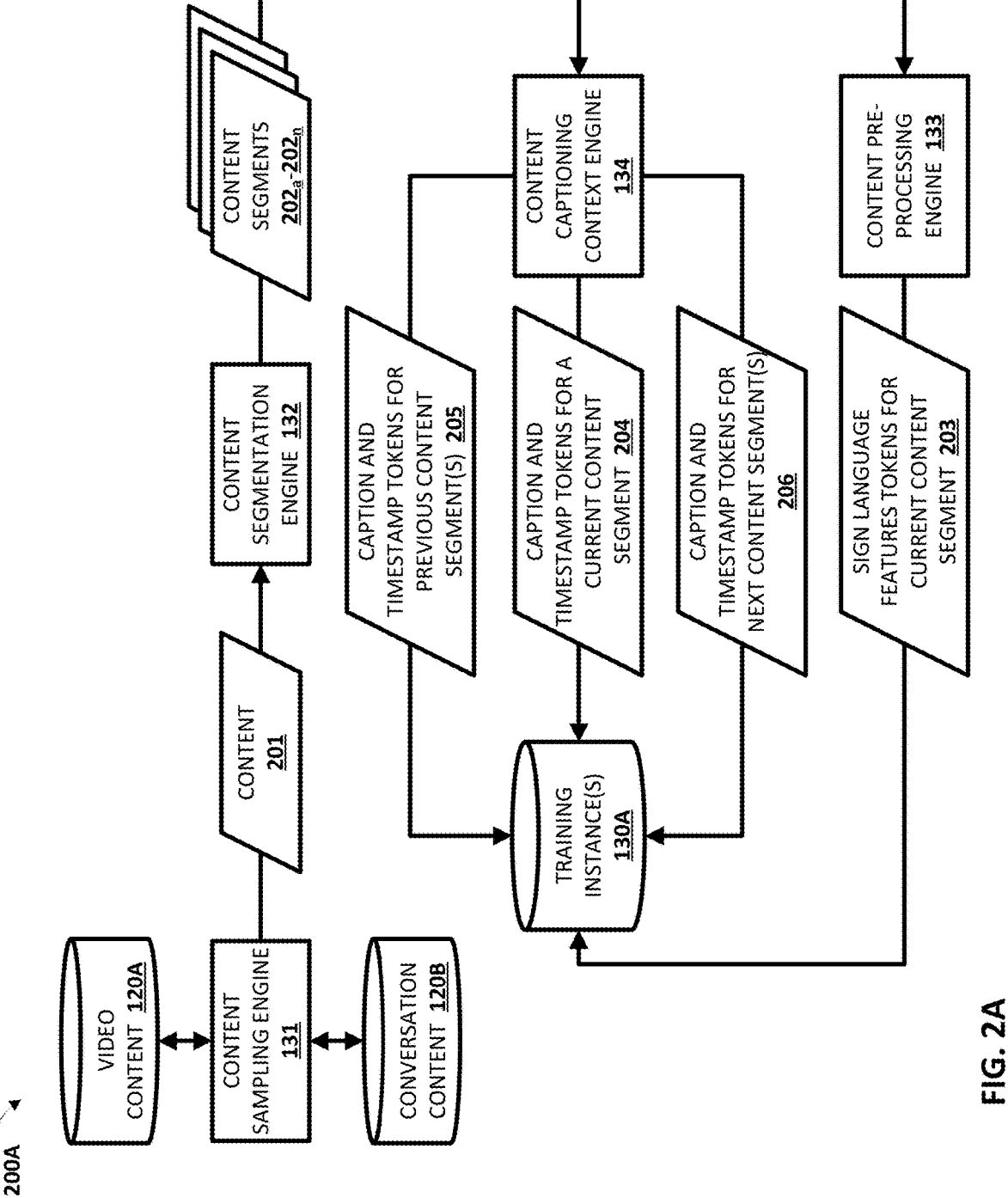
FIG. 2A depicts an example process flow using various components from the example environment from FIG. 1 to generate a plurality of training instances for training a sign language captioning model, in accordance with various implementations.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, a user input engine 111, a rendering engine 112, and a sign language captioning system client 113. The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device, etc.). Additional and/or alternative client devices may be provided.

The user input engine 111 can detect various types of user input at the client device 110. In some examples, the user input detected at the client device 110 can include spoken utterance(s) of a human user of the client device 110 that is detected via microphone(s) of the client device 110. In these examples, the microphone(s) of the client device 110 can generate audio data that captures the spoken utterance(s). In other examples, the user input detected at the client device 110 can include touch input of a human user of the client device 110 that is detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input.

The rendering engine 112 can cause content and/or other output to be visually rendered for presentation to the user at the client device 110 (e.g., via a touch sensitive display or other user interface output device(s)) and/or audibly rendered for presentation to the user at the client device 110 (e.g., via speaker(s) or other user interface output device(s)). The content and/or other output can include, for example, a transcript of a conversation between a user of the client device 110 and an automated assistant executing at least in part at the client device 110, a transcript of a conversation between the automated assistant executing at least in part at the client device 110 and an additional user that is in addition to the user of the client device 110, a transcript of a conversation between a user of the client device 110 and an additional user that is in addition to the user of the client device 110, notifications, selectable graphical elements, and/or any other content and/or output described herein.

Further, the client device 110 is illustrated in FIG. 1 as communicatively coupled, over one or more networks 199 (e.g., any combination of Wi-Fi®, Bluetooth®, or other local area networks (LANs); ethernet, the Internet, or other wide area networks (WANs); and/or other networks), to a sign language captioning system 120 implemented remotely from the client device 110. The sign language captioning system 120 can be implemented by, for example, a high-performance server, a cluster of high-performance servers, and/or any other computing device that is remote from the client device 110. The sign language captioning system 120 includes, in various implementations, a pre-processing engine 130, a training engine 140, and an inference engine 150. The pre-processing engine 130 can include various sub-engines, such as a content sampling engine 131, a content segmentation engine 132, a content pre-processing engine 133, and a content captioning context engine 134. Further, the training engine 140 can include various sub-engines, such as a token engine 141, a processing engine 142, a translation engine 143, a caption alignment engine 144, and a loss engine 145. Moreover, the inference engine 150 can include various sub-engines, such as an offline inference engine 151 and an online inference engine 152.

The sign language captioning system 120 can interact with various databases. For instance, and as described with respect to FIG. 2A, the pre-processing engine 130 can leverage video content 120A database and conversation content database 120B in generating a plurality of training instances for training a sign language captioning model; the pre-processing engine 130 can store the plurality of training instances for training the sign language captioning model in training instance(s) database 130A; the training engine 140A can access machine learning (ML) model(s) database 140A to obtain the sign language captioning model for training thereof and utilizing the plurality of training instances stored in the training instance(s) database 130A; and the inference engine 150 can store sign captions generated by the sign language captioning model in sign captions database 150A. Although FIG. 1 is depicted with respect to certain databases, it should be understood that is for the sake of example and is not meant to be limiting.

Moreover, the client device 110 can execute the sign language captioning system client 113. An instance of the sign language captioning client 113 can be an application that is separate from an operating system of the client device 110 (e.g., installed "on top" of the operating system)—or can alternatively be implemented directly by the operating system of the client device 110. The sign language captioning system client 113 can communicate with the sign language captioning system 120 via one or more of the networks 199 (e.g., as shown in FIG. 1). It should be understood that the sign language captioning system client 113 can implement the sign language captioning system 120 locally at the client device 110. However, it should also be understood that one or more aspects of the sign language captioning system 120 can be implemented remotely from the client device 110 (e.g., exclusively at sign language captioning system 120), or at both remotely the sign language captioning system 120 and locally the client device 110 in a distributed manner.

Furthermore, the client device 110 and/or the sign language captioning system 120 may include one or more memories for storage of data and software applications, one or more processors for accessing data and executing the software applications, and other components that facilitate communication over one or more of the networks 199. In some implementations, one or more of the software applications can be installed locally at the client device 110, whereas in other implementations one or more of the software applications can be hosted remotely from the client device 110 (e.g., by one or more servers), but accessible by the client device 110 over one or more of the networks 199.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 and/or the automated assistant system 120 (e.g., over the one or more networks 199). As another example, a given client device can be utilized by multiple users in a shared setting (e.g., a group of users, a household, etc.).

As described herein, the sign language captioning system 120 can be utilized to train a sign language captioning model and/or utilized in subsequent utilization of the trained sign language captioning model. The sign language captioning model described herein can be, for example, an encoder-decoder Transformer ML model, an encoder-only Transformer ML model, a decoder-only Transformer ML model, or any sequence-to-sequence based ML model that optionally includes an attention mechanism or other memory. Prior to training the sign language captioning model, the sign language captioning system 120 can generate a plurality of training instances (e.g., as described with respect to FIGS. 2A and 3). This enables the sign language captioning system 120 to train the sign language captioning model based on the plurality of training instances (e.g., as described with respect to FIGS. 2B and 4). Subsequently, the sign language captioning system 120 can cause the trained sign language captioning model to be utilized in an offline manner (e.g., as described with respect to FIGS. 5A and 5B) and/or in an online manner (e.g., as described with respect to FIG. 6). Additional description of the pre-processing engine 130, the training engine 140, and the inference engine 150 is provided herein (e.g., with respect to FIGS. 2A, 2B, 3, 4, 5A, 5B, and 6).

Referring now to FIG. 2A, an example process flow 200A utilizing various components from the example environment of FIG. 1 to generate a plurality of training instances for training a sign language captioning model is depicted. For the sake of example, assume that the content sampling engine 131 samples content 201 from one or more databases (e.g., the video content database 120A and/or the conversation content database 120B). Regardless of a source of the content 201 (e.g., the video content database 120A or the conversation content database 120B), the content 201 may include at least sign language video content (e.g., vision data that captures a human performing a plurality of sign language signs) and a timestamped caption track for the sign language video content.

Further, the content segmentation engine 132 can segment the content 201 into a plurality of content segments $202_a$-

$202_n$. In some implementations, each of the plurality of content segments $202_a$-$202_n$ may be of a same duration of time that is proportional to a duration of the content 201. For example, assume that the content 201 is a 5-minute video that captures a human performing a plurality of sign language signs. In this example, each of the plurality of content segments $202_a$-$202_n$ may be 30-seconds such that the 5-minute video is segmented into 10 different content segments of 30-seconds each and along with a subset of the timestamped caption track for each of the 30-second segments. In other implementations, one or more of the plurality of content segments $202_a$-$202_n$ may be of different durations of time. For example, assume that the content 201 is a 5-minute video that captures a human performing a plurality of sign language signs. In this example, a first one of the plurality of content segments $202_a$-$202_n$ may be 30-seconds and along with a subset of the timestamped caption track for the 30-second segment, a second one of the plurality of content segments $202_a$-$202_n$ may be 45-seconds and along with a subset of the timestamped caption track for the 45-second segment, a third one of the plurality of content segments $202_a$-$202_n$ may also be 45-seconds and along with a subset of the timestamped caption track for the 45-second segment, a fourth one of the plurality of content segments $202_a$-$202_n$ may also be 30-seconds and along with a subset of the timestamped caption track for the 30-second segment, a fifth one of the plurality of content segments $202_a$-$202_n$ may be 1-minute and along with a subset of the timestamped caption track for the 1-minute segment, and so on for the 5-minute video.

In some implementations, each of the plurality of content segments $202_a$-$202_n$ may be disparate, such that they do not include any overlapping content. Continuing with the above example where the content 201 is a 5-minute video that captures a human performing a plurality of sign language signs and each of the plurality of content segments $202_a$-$202_n$ are of the same duration of time, the 10 different content segments of 30-seconds each and the subset of the timestamped caption track for each of the 30-second segments may each be disparate and not include any overlapping portions of the sign language video content or any overlapping portions of the timestamped caption track. In implementations where the plurality of content segments $202_a$-$202_n$ are different durations of time, they may be segmented in the same or similar overlapping manner. In additional or alternative implementations, one or more of the plurality of content segments $202_a$-$202_n$ may include overlapping content. Continuing with the above example where the content 201 is a 5-minute video that captures a human performing a plurality of sign language signs and each of the plurality of content segments $202_a$-$202_n$ are of the same duration of time, a first one of the plurality of content segments $202_a$-$202_n$ may include the first 40-seconds of the sign language video content (e.g., include 10 additional seconds of the sign language video content and 10 additional seconds of the timestamped caption track), a second one of the plurality of content segments $202_a$-$202_n$ may include the first 25-seconds of the sign language video content to the first 65 seconds of the sign language video content (e.g., include 5 additional seconds of the sign language video content prior to the second 30 seconds of the sign language video content and 5 additional seconds of the timestamped caption track prior to the second 30 seconds of the sign language video content, and include 5 additional seconds of the sign language video content after the second 30 seconds of the sign language video content and 5 additional seconds of the timestamped caption track after the second 30 seconds of the sign language video content). In implementations where the plurality of content segments $202_a$-$202_n$ are different durations of time, they may be segmented in the same or similar manner.

Moreover, the content pre-processing engine 133 can process the corresponding subset of the sign language video content for each of the plurality of content segments $202_a$-$202_n$ to generate corresponding sign language feature tokens for a current content segment 203. For example, the content pre-processing engine 133 can process, using an image encoder, a given one of the plurality of content segments $202_a$-$202_n$ to generate one or more corresponding image embeddings of the human performing a subset of the plurality of sign language signs included in the given one of the plurality of content segments $202_a$-$202_n$ as the corresponding sign language feature tokens for the current content segment 203. As another example, the content pre-processing engine 133 can process, using a video encoder, a given one of the plurality of content segments $202_a$-$202_n$ to generate a corresponding video embedding of the human performing a subset of the plurality of sign language signs included in the given one of the plurality of content segments $202_a$-$202_n$ as the corresponding sign language feature tokens for the current content segment 203. As yet example, the content pre-processing engine 133 can process, using a MediaPipe Holistic, a given one of the plurality of content segments $202_a$-$202_n$ to generate a corresponding skeletonized representation (e.g., as a linear projection) of the human performing a subset of the plurality of sign language signs included in the given one of the plurality of content segments $202_a$-$202_n$ as the corresponding sign language feature tokens for the current content segment 203.

Meanwhile, in parallel and/or in sequence, the content captioning context engine 134 can process, using a text encoder, the corresponding subset of the timestamped caption track for a given one of the plurality of content segments $202_a$-$202_n$ to generate caption and timestamp tokens for a current content segment 204. In some implementations, the content captioning context engine 134 can also process, using the text encoder, the corresponding subset of the timestamped caption track for one or more previous content segments of the plurality of content segments $202_a$-$202_n$ (e.g., that precede the given one of the plurality of content segments $202_a$-$202_n$ in the sign language video content) to generate caption and timestamp tokens for one or more of the previous content segments 205. In additional or alternative implementations, the content captioning context engine 134 can additionally, or alternatively, process, using the text encoder, the corresponding subset of the timestamped caption track for one or more next content segments of the plurality of content segments $202_a$-$202_n$ (e.g., that follow the given one of the plurality of content segments $202_a$-$202_n$ in the sign language video content) to generate caption and timestamp tokens for one or more of the next content segments 206.

Notably, in implementations where each of the plurality of content segments $202_a$-$202_n$ are overlapping, the content captioning context engine 134 need not determine the caption and timestamp tokens for one or more of the previous content segments 205 and/or the caption and timestamp tokens for one or more of the next content segments 206 since content from previous content segments and/or next content segments in inherently included in the given one of the plurality of content segments $202_a$-$202_n$. Accordingly, the content captioning context engine 134 may only determine the caption and timestamp tokens for one or more of the previous content segments 205 and/or the caption and timestamp tokens for one or more of the next content segments 206 in implementations where each of the plurality of content segments $202_a$-$202_n$ are disparate, such that they do not include any overlapping content.

Accordingly, a given training instance can be stored in the training instance(s) database 130A that includes at least the corresponding sign language feature tokens for the current content segment 203 (e.g., as part of the corresponding training instance input for the given training instance) and the caption and timestamp tokens for the current content segment 204 (e.g., as part of the corresponding training instance output for the given training instance). However, it should be noted that, in some implementations, the given training instance may also include the caption and timestamp tokens for one or more of the previous content segments 205 and/or the caption and timestamp tokens for one or more of the next content segments 206 (e.g., as part of the corresponding training instance output for the given training instance). This process can be repeated for each of the plurality of content segments $202_a$-$202_n$ to generate a plurality of training of instances based on the content 201 that is obtained from one or more of the databases. Further, additional training instances can be generated in the same or similar manner based on additional content that is obtained from one or more of the databases.

Moreover, in implementations where the source of the content 201 is the conversation content database 120B, the caption and timestamp tokens for one or more of the previous content segments 205 may include caption and timestamp tokens for one or more of the previous turns of a conversation (e.g., a previous response provided by an automated assistant and to the user, a previous dialog turn by an additional user that is engage in a conversation with the user), and the caption and timestamp tokens for one or more of the next content segments 206 may include caption and timestamp tokens for one or more of the subsequent turns of a conversation (e.g., a next response provided by an automated assistant and to the user, a next dialog turn by an additional user that is engage in a conversation with the user). Accordingly, in these implementations, it may be particularly advantageous to include the caption and timestamp tokens for one or more of the previous content segments 205 and/or the caption and timestamp tokens for one or more of the next content segments 206 in the given training instance for additional context on the ongoing conversation, thereby conditioning the sign language captioning model during training to also consider prior and/or subsequent turns of the conversation.

Figure 2B:
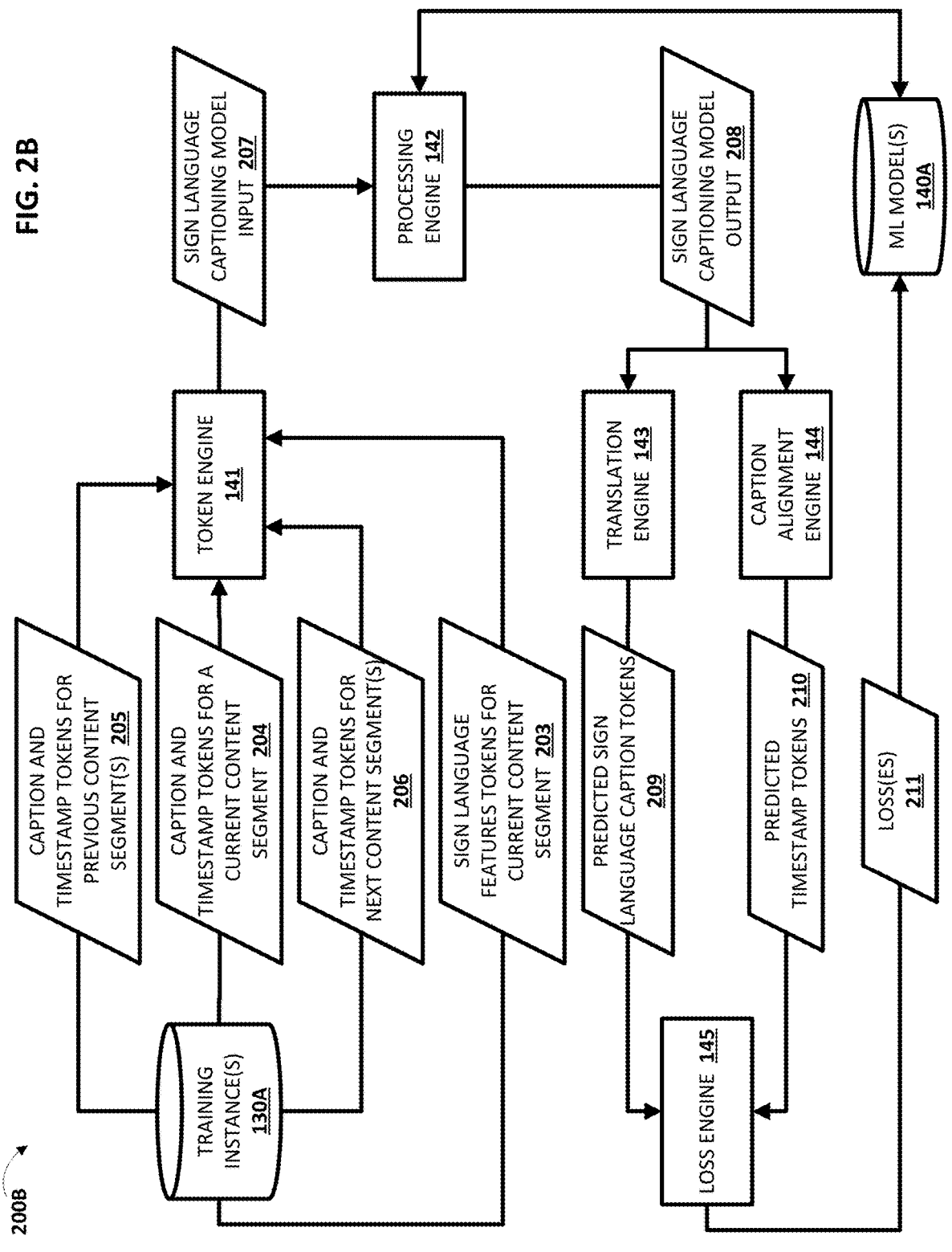
FIG. 2B depicts an example process flow using various components from the example environment from FIG. 1 to train a sign language captioning model, in accordance with various implementations.

Referring now to FIG. 2B, an example process flow 200B utilizing various components from the example environment of FIG. 1 to train a sign language captioning model is depicted. For the sake of example, assume that a plurality of training instances for utilization in training the sign language captioning model are stored in the training instance(s) database 130A (e.g., generated as described with respect to the process flow 200A of FIG. 2A or otherwise available). The token engine 141 can obtain a given training instance that includes at least corresponding sign language feature tokens for the current content segment 203 (e.g., as part of the corresponding training instance input for the given training instance) and caption and timestamp tokens for a current content segment 204 (e.g., as part of the corresponding training instance output for the given training instance). In some implementations, the given training instance may further include caption and timestamp tokens for one or more previous content segments 205 and/or caption and timestamp tokens for one or more next content segments 206

(e.g., as part of the corresponding training instance output for the given training instance). Further, in implementations where the corresponding sign language features, the captions, and/or the timestamps are not tokenized, the token engine 141 can tokenize this content in the same or similar manner as described with respect to the content pre-processing engine 133 and the content captioning context engine 134 in the process flow 200A of FIG. 2A.

Further, the token engine 141 can format sign language captioning model input 207 for the given training instance. The sign language captioning model input 207 can include, for example, the corresponding sign language feature tokens for the current content segment 203, instructions for the sign language captioning model to determine predicted sign language captions for sign language content segment represented by the corresponding sign language feature tokens for the current content segment 203, instructions for the sign language captioning model to determine timestamps for the predicted sign language captions with respect to the sign language content segment represented by the corresponding sign language feature tokens for the current content segment 203, and/or other content or instructions.

Moreover, the processing engine 142 can process, using the sign language captioning model (e.g., stored in the ML model(s) database 140A), to generate sign language captioning output 208. The sign language captioning output 208 can be, for example, one or more probability distributions over respective sequences of tokens, such as a first probability distribution over a sequence of predicted sign language caption tokens and a second probability distribution over a sequence of predicted timestamp tokens. Accordingly, and based on the one or more probability distributions over the respective sequences of tokens, the translation engine 143 can determine predicted sign language caption tokens 209 (e.g., based on the first probability distribution over the sequence of predicted sign language caption tokens), and the caption alignment engine 144 can determine predicted timestamp tokens 210 (e.g., based on the second probability distribution over the sequence of predicted timestamp tokens).

Based on the predicted sign language caption tokens 209 and the predicted timestamp tokens 210, the loss engine 145 can determine one or more losses 211 for utilization in updating the sign language captioning model. For example, the caption and timestamp tokens for the current content segment 204 can be utilized as a supervision signal such that the loss engine 145 can compare the predicted sign language caption tokens 209 and the predicted timestamp tokens 210 to the caption and timestamp tokens for the current content segment 204 to generate the one or more losses. Further, and based on the one or more losses, weights of the sign language captioning model can be updated (e.g., via backpropagation). Further, the sign language captioning model can be further updated in the same or similar manner based on additional training instances obtained from the training instance(s) database 130A.

Turning now to FIG. 3, a flowchart illustrating an example method 300 of generating a plurality of training instances for training a sign language captioning model is depicted. For convenience, the operations of the method 300 are described with reference to a system that performs the operations. This system of the method 300 includes at least one processor, memory, and/or other component(s) of computing device(s) (e.g., client device 110 of FIGS. 1, 5A, 5B, and 6, sign language captioning system 120 of FIG. 1, computing device 710 of FIG. 7, and/or other computing devices). Moreover, while operations of the method 300 are shown in a particular order, this is not meant to be limiting. One or more operations may be reordered, omitted, and/or added.

At block 352, the system obtains sign language video content that includes a plurality of signs being performed by a user and a caption track for the plurality of signs. For example, the system can obtain the sign language video content from one or more databases (e.g., from the video content database 120A and/or the conversation content database 120B as described with respect to FIGS. 1 and 2A).

At block 354, the system segments the sign language video content into a plurality of sign language video content segments, each of the plurality of sign language video content segments including a subset of the plurality of signs being performed by the user and a subset of the caption track. For example, the system can segment the sign language video content into the plurality of sign language video content segments into disparate segments or overlapping segments that are of the same duration of time or dynamic durations of time (e.g., as described with respect to the content segmentation engine of FIGS. 1 and 2A).

At block 356, the system determines whether there is a given sign language video content segment, from among the plurality of sign language video content segments of the sign language video content, for further processing. For example, the system can identify the given sign language video content segment, from among the plurality of sign language video content segments of the sign language video content, for the further processing assuming that not all of the plurality of sign language video content segments have been processed for generation of the plurality of training instances.

If, at an iteration of block 356, then the system determines that there is a given sign language video content segment for further processing, the system proceeds to block 358. At block 358, the system contextualizes the given sign language video content segment. For example, in implementations where the plurality of sign language video content segments obtained from the video content database 120A, the system can supplement the given sign language video content segment with portions of a prior sign language video content segment and/or a next sign language video content segments (e.g., as described with respect to the content pre-processing engine 133 and the context captioning context engine 134 of FIGS. 1 and 2A). As another example, in implementations where the plurality of sign language video content segments obtained from the conversation content database 120B, the system can supplement the given sign language video content segment with portions of prior dialog turns of the conversation and/or a next dialog turn of the conversation (e.g., as described with respect to the content pre-processing engine 133 and the context captioning context engine 134 of FIGS. 1 and 2A).

At block 360, the system determines corresponding sign language feature tokens for the given sign language video content segment. For example, the system can process, using one or more encoders and/or MediaPipe Holistic, at least the subset of the plurality of signs being performed in the given sign language video content segment to determine the sign language feature tokens (e.g., as described with respect to the content pre-processing engine 133 of FIGS. 1 and 2A).

At block 362, the system determines corresponding ground truth caption token tokens for the given sign language video content segment and corresponding ground truth timestamp tokens for the given sign language video content segment. For example, the system can process, using one or more encoders, at least the subset of the caption track for the plurality of signs being performed in the given sign language video content segment to determine the corresponding ground truth caption token tokens and the corresponding ground truth timestamp tokens (e.g., as described with respect to the content captioning context engine 134 of FIGS. 1 and 2A).

At block 364, the system stores at least: (1) the corresponding sign language feature tokens for the given sign language video content segment, (2) the corresponding ground truth caption tokens for the given sign language video content segment, and (3) the corresponding ground truth timestamp tokens for the given sign language video content segment, as a given training instance. The system returns to block 356 to determine whether there is a given additional sign language video content segment, from among the plurality of sign language video content segments of the sign language video content, for further processing. Accordingly, the system can continue processing the plurality of sign language video content segments to generate additional training instances based on the initially obtained sign language video content to be utilized in training the sign language captioning model.

If, at an iteration of block 356, the system determines that there is not a given additional sign language video content segment for further processing, then the system proceeds to block 366. At block 366, the system determines whether there is additional sign language video content that can be obtained. If, at an iteration of block 366, the system determines that there is no additional sign language video content that can be obtained, then the system monitors for additional sign language video content at block 366. If, at an iteration of block 366, the system determines that there is additional sign language video content that can be obtained, then the system returns to block 354 to obtain the additional sign language video content and proceeds with an additional iteration of the method 300, but with respect to the additional sign language video content. Accordingly, the system can continue obtaining and processing sign language video content to generate additional training instances based on subsequently obtained sign language video content to be utilized in training the sign language captioning model.

Turning now to FIG. 4, a flowchart illustrating an example method 400 of training a sign language captioning model is depicted. For convenience, the operations of the method 400 are described with reference to a system that performs the operations. This system of the method 400 includes at least one processor, memory, and/or other component(s) of computing device(s) (e.g., client device 110 of FIGS. 1, 5A, 5B, and 6, sign language captioning system 120 of FIG. 1, computing device 710 of FIG. 7, and/or other computing devices). Moreover, while operations of the method 400 are shown in a particular order, this is not meant to be limiting. One or more operations may be reordered, omitted, and/or added.

At block 452, the system obtains a plurality of training instances for training a sign language captioning model, each of the plurality of training instances including a corresponding training instance input and a corresponding training instance output. In some implementations, the system may have previously generated one or more of the plurality of training instances (e.g., as described with respect to the process flow 200A of FIG. 2A and the method 300 of FIG. 3). In additional or alternative implementations, the system may have access to one or more of the plurality of training instances without having previously generated them (e.g., hand curated training instances).

At block 454, the system determines whether there is a given training instance for utilization in training the sign language captioning model. If, at an iteration of block 454, the system determines that there is no given training instance for utilization in training the sign language captioning model, then the system proceeds to block 352 to generate a plurality of training instances according to the method 300 of FIG. 3.

If, at an iteration of block 454, the system determines that there is a given training instance for utilization in training the sign language captioning model, then the system proceeds to block 456. At block 456, the system processes, using the sign language captioning model, at least corresponding sign language feature tokens for a sign language video content segment, included in the corresponding training instance input of the given training instance, to generate sign language captioning model output. For example, the system can process, using the sign language captioning model, sign language captioning input, that includes that the training instance input of the given training instance, to generate the sign language captioning output (e.g., as described with respect to the processing engine 142 of FIGS. 1 and 2B).

At block 458, the system determines, based on the sign language captioning model output, predicted caption tokens associated with predicted sign language captions for the sign language video content segment and predicted timestamp tokens that are predicted to align the predicted sign language captions with the sign language video content segment. For example, the sign language captioning model output can include one or more probability distributions over respective sequences of tokens, and the system can determine the predicted caption tokens and the predicted timestamp tokens based on the one or more probability distributions over the respective sequences of tokens (e.g., as described with respect to the translation engine 143 and the caption alignment engine 144 of FIGS. 1 and 2B).

At block 460, the system generates, based on a comparison of: (1) the predicted captions tokens and ground truth caption tokens, included in the corresponding training instance output of the given training instance, and/or (2) the predicted timestamp tokens and ground truth timestamp tokens, included in the corresponding training instance output of the given training instance, one or more losses. At block 462, the system updates, based on the one or more of the losses, the sign language captioning model. For example, the system can generate the one or more losses and cause the one or more losses to be backpropagated across the sign language captioning model, thereby updating weights of the sign language captioning model (e.g., as described with respect to the loss engine 145 of FIGS. 1 and 2B).

At block 464, the system determines whether one or more conditions for causing the sign language captioning model to be deployed are satisfied. The one or more conditions can include, for example, whether the sign language captioning model has been updated based on a threshold quantity of training instances, whether performance of the sign language captioning model satisfies a threshold quality of performance, and/or other conditions.

If, at an iteration of block 464, the system determines that the one or more conditions for causing the sign language captioning model to be deployed are not satisfied, then the system returns to block 454 to determine whether there is a given additional training instance for utilization in further training the sign language captioning model and continue with the method 400 of FIG. 4.

If at an iteration of block 464, the system determines that the one or more conditions for causing the sign language captioning model to be deployed are satisfied, then the system proceeds to block 466. At block 466, the system causes the sign language captioning model to be deployed. For example, the system can cause the sign language captioning model to be deployed in an offline manner (e.g., as described with respect to FIGS. 5A and 5B) and/or in an online manner (e.g., as described with respect to FIG. 6).

Figure 5A:
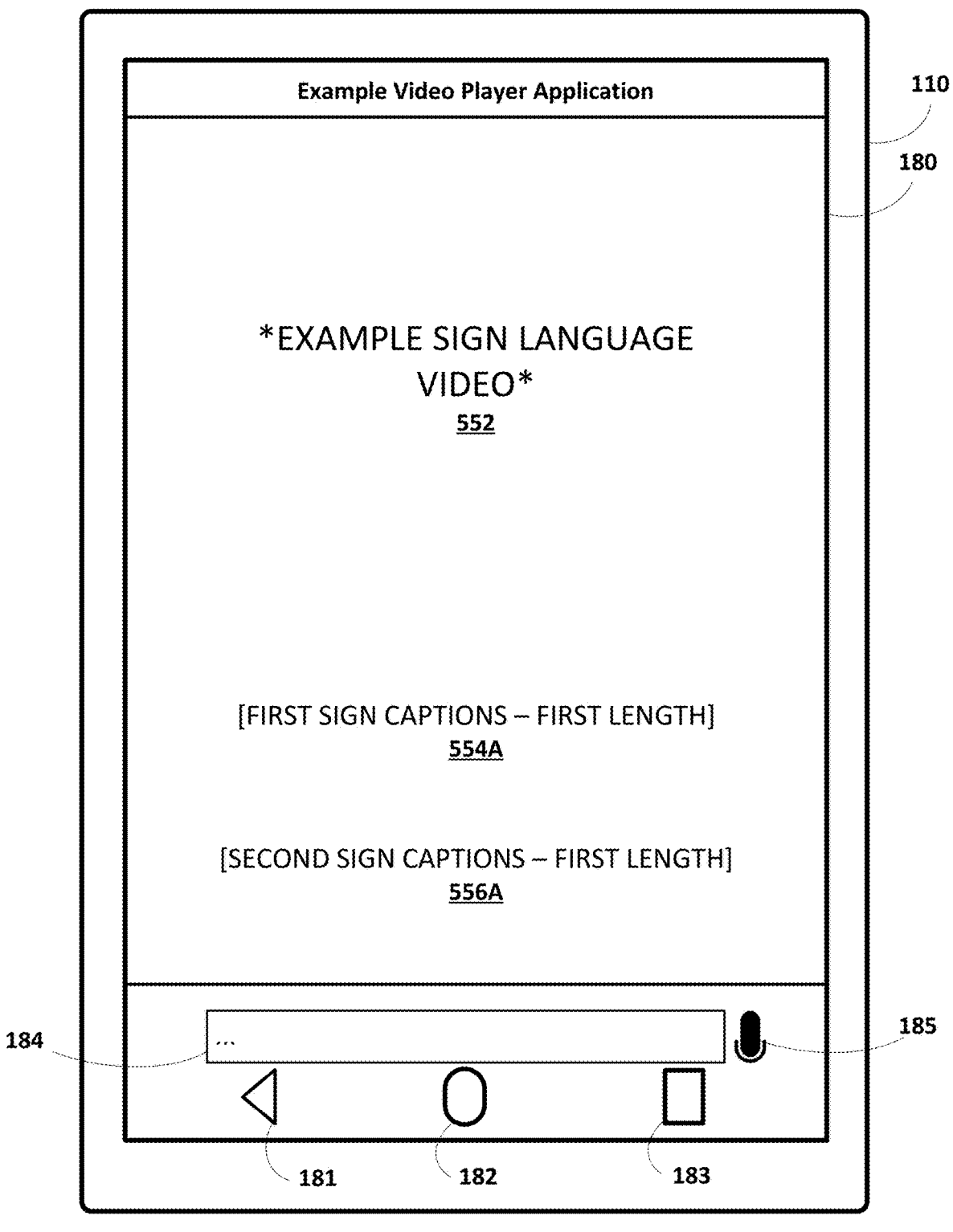
FIGS. 5A and 5B depict various non-limiting examples of utilizing a trained sign language captioning model in an offline manner, in accordance with various implementations.
Figure 5B:
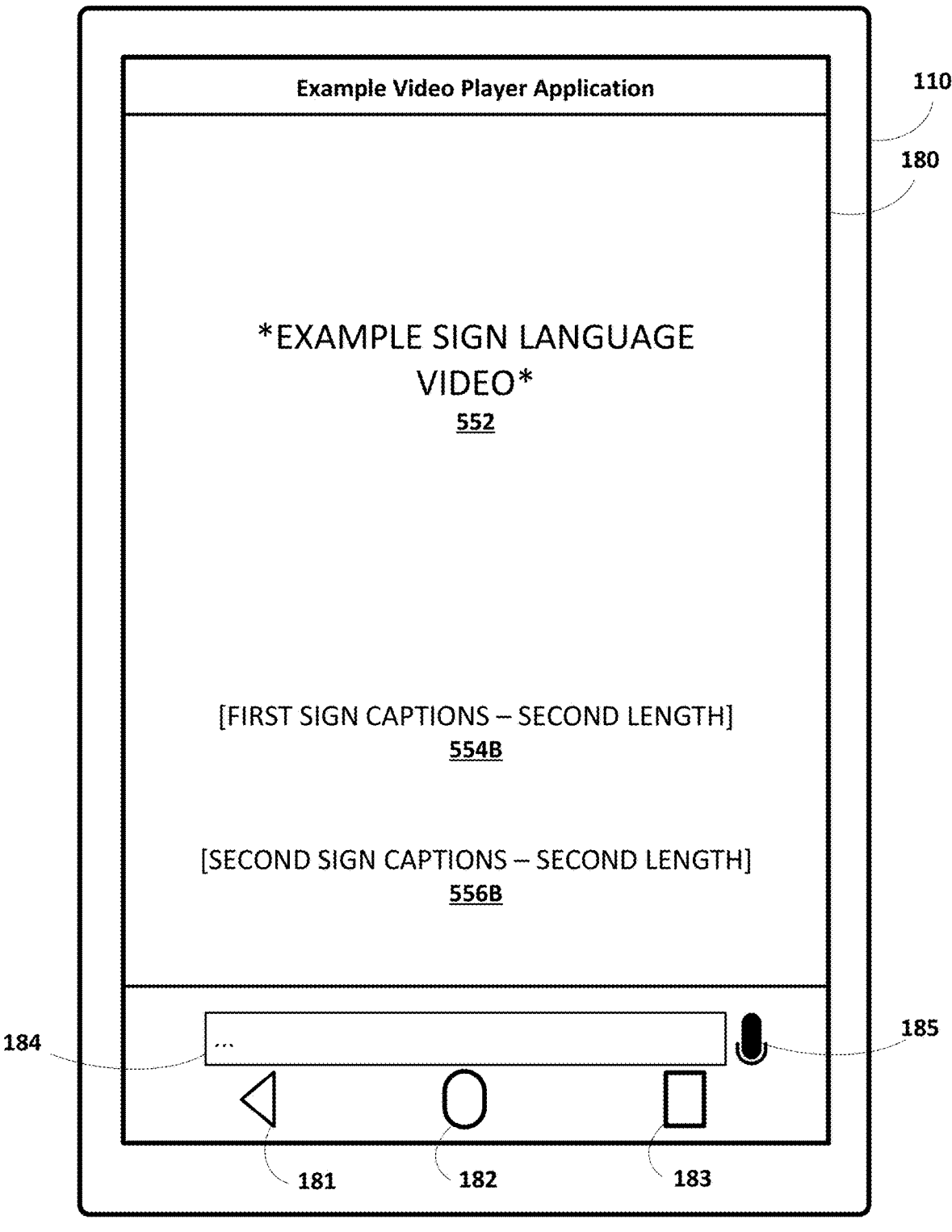

Turning now to FIGS. 5A and 5B, various non-limiting examples of utilizing a trained sign language captioning model in an offline manner are depicted. FIGS. 5A and 5B each depict a client device 110 (e.g., an instance of the client device 110 from FIG. 1) having a display 180. Although the client device 110 of FIGS. 5A and 5B is depicted as a mobile phone, it should be understood that is not meant to be limiting. The client device 110 can be, for example, a stand-alone assistant device (e.g., with speaker(s) and/or a display), a laptop, a desktop computer, a wearable computing device (e.g., a smart watch, smart headphones, etc.), a vehicular computing device, and/or any other client device capable of making telephonic calls.

The display 180 of the client device 110 in FIGS. 5A and 5B further includes a textual input interface element 184 that the user may select to generate user input via a keyboard (virtual or real) or other touch and/or typed input, and a spoken input interface element 185 that the user may select to generate user input via microphone(s) of the client device 110. In some implementations, the user may generate user input via the microphone(s) without selection of the spoken input interface element 185. For example, active monitoring for audible user input via the microphone(s) may occur to obviate the need for the user to select the spoken input interface element 185. In some of those and/or in other implementations, the spoken input interface element 185 may be omitted. Moreover, in some implementations, the textual input interface element 184 may additionally and/or alternatively be omitted (e.g., the user may only provide audible user input). The display 180 of the client device 110 in FIGS. 5A-5D also includes system interface elements 181, 182, 183 that may be interacted with by the user to cause the client device 110 to perform one or more actions.

Referring specifically to FIG. 5A, for the sake of example assume that a user of the client device 110 is viewing an example sign language video 552 via an example video player application that is accessible via the client device 110. Further assume that the example sign language video 552 was previously processed using a trained sign language captioning model (e.g., trained as described with respect to FIGS. 2B and 4). Notably, a timestamped caption track can be generated based on the prior processing of the example sign language video 552 and through utilization of the trained sign language captioning model. Accordingly, even though the example sign language video 552 was not originally uploaded to a repository associated with the example video player application with any captions and no human reviewer analyzed the example sign language video 552 to provide the captions, the trained sign language captioning model can be utilized to generate the time-stamped caption track for the example sign language video 552.

In the example of FIG. 5A, the timestamped caption track for a first portion of the example sign language video 552 may include first sign captions that are of a first length as indicated by 554A. Further, the timestamped caption track for a second portion of the example sign language video 552 may include second sign captions that are also of the first length as indicated by 556A. However, it should be understood that a length of the sign captions that are generated for inclusion in the timestamped caption track for the example sign language video 552 may vary by virtue of how the trained sign language captioning model is trained and/or based on desired caption lengths of various users. Accordingly, and referring specifically to FIG. 5B, for the sake of example assume that another user of the client device 110 is viewing the example sign language video 552 via an example video player application that is accessible via the client device 110. In the example of FIG. 5B, the time-stamped caption track for a first portion of the example sign language video 552 may include first sign captions that are of a second length as indicated by 554B. Further, the timestamped caption track for a second portion of the example sign language video 552 may include second sign captions that are also of the second length as indicated by 556B.

In some implementations, this variance in the caption length may be due to a human reviewer in the loop while the trained sign language captioning model is being utilized in the offline manner. For example, the human reviewer can perform the translation of a plurality of signs included in the newly added sign language video content, but the trained sign language captioning model can be utilized to generate the timestamps for the caption track for the example sign language video 552. As another example, the human reviewer can provide corrections with respect to the time-stamped caption track for the example sign language video 552, which may alter the captions for the caption track and/or the timestamps for the caption track for the example sign language video 552. However, it should be understood that the difference in length of the timestamped caption track may simply be due to how the trained sign language captioning model is trained to determine where to include breaks in the captions.

Figure 6:
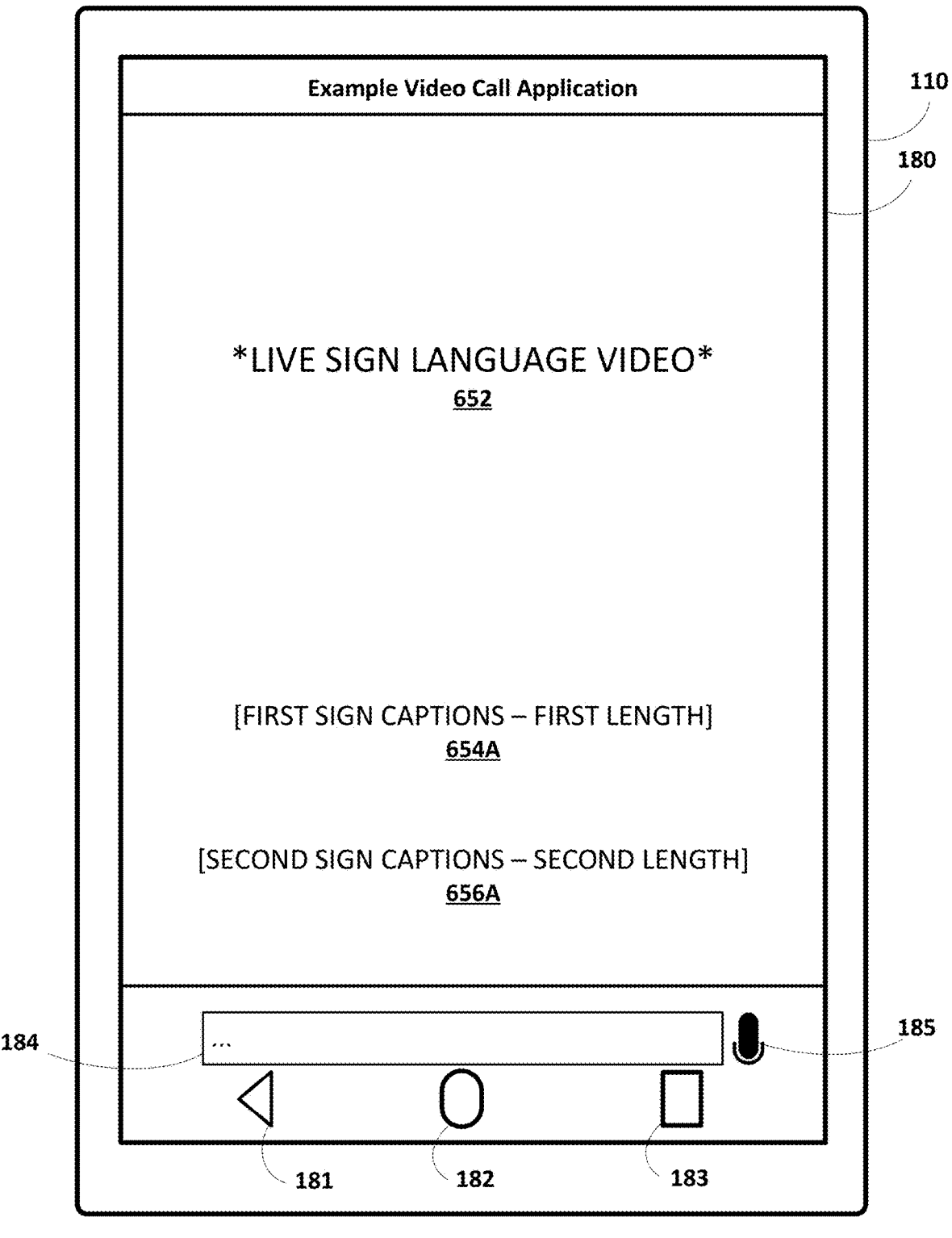
FIG. 6 depicts a non-limiting example of utilizing a trained sign language captioning model in an online manner, in accordance with various implementations.

Turning now to FIG. 6, a non-limiting example of utilizing a trained sign language captioning model being used in an online manner is depicted. FIG. 6 depicts the client device 110 having the display 180 from FIGS. 5A and 5B along with the same interface elements 181, 182, 183, 184, and 185. Similar to FIGS. 5A and 5B, although the client device 110 of FIGS. 5A-5D is depicted as a mobile phone, it should be understood that is not meant to be limiting.

Referring specifically to FIG. 6, for the sake of example assume that a user of the client device 110 is engaged in a conversation that includes a live sign language video 652 via an example video call application that is accessible via the client device 110. Further assume that the live sign language video 652 is being processed using a trained sign language captioning model (e.g., trained as described with respect to FIGS. 2B and 4). Notably, a timestamped caption track can be generated based on real-time processing of the live sign language video 652 and through utilization of the trained sign language captioning model. Accordingly, even though the live sign language video 652 has never been processed by the trained sign language captioning model and no human reviewer is analyzing the live sign language video 652 to provide the captions, the trained sign language captioning model can be utilized to generate the timestamped caption track for the live sign language video 652.

In the example of FIG. 6, the timestamped caption track for a first portion of the live sign language video 652 may include first sign captions that are of a first length as indicated by 654A. Further, the timestamped caption track for a second portion of the live sign language video 652 may include second sign captions that are of a second length as indicated by 656A. However, it should be understood that a length of the sign captions that are generated for inclusion in the timestamped caption track for the live sign language video 652 may vary by virtue of how the trained sign language captioning model is trained and/or based on desired caption lengths of various users.

For example, one or more of the users engaged in the conversation can specify a caption duration over which the sign language captioning model will autoregress over the live sign language video 652, thereby enabling the trained sign language captioning model to re-translate the plurality of sign language signs. For instance, if one or more of the users want streaming-like timestamped caption tracks, then one or more of the users can specify a relatively short duration of time (e.g., 2 seconds, 4 seconds, or the like) to ensure the timestamped caption tracks is generated at a sign-level, word-level, etc. which, in turn, will reduce latency in causing portions of the timestamped caption track to be visually rendered at the client device 110 (or an additional client device). However, if one or more of the users is less concerned with streaming-like timestamped caption tracks, then one or more of the users can specify a relatively longer duration of time (e.g., 10 seconds, 20 seconds, or the like) to ensure the timestamped caption tracks is generated at a phrase-level, sentence-level, etc. which, in turn, will increase latency in causing portions of the timestamped caption track to be visually rendered at the client device 110 (or an additional client device). Notably, different users engaged in the conversation can specify different durations of time over which to the trained sign language captioning model should autoregress over the live sign language video 652, such that different users engaged in the conversation can perceive different timestamped caption tracks for the same conversation.

Although FIGS. 5A, 5B, and 6 are described with respect to particular examples, it should be understood that those examples are provided to illustrate various techniques contemplated herein and are not meant to be limiting. Further, it should be understood that other types of conversations and use cases for utilizing the trained sign language captioning model are contemplated herein including, but not limited to, conversations between a user of the client device 110 and an automated assistant that is accessible at the client device 110.

Figure 7:
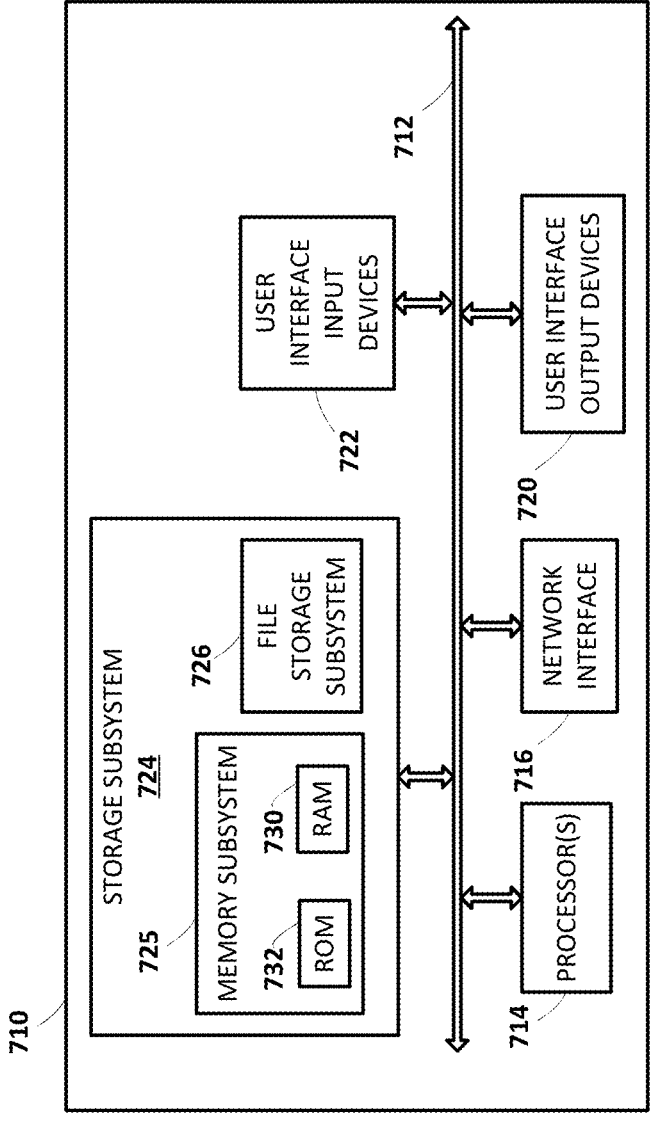
FIG. 7 depicts an example architecture of a computing device, in accordance with various implementations.

Turning now to FIG. 7, a block diagram of an example computing device 710 that may optionally be utilized to perform one or more aspects of techniques described herein. In some implementations, one or more of a client device, remote system component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display (e.g., a touch sensitive display), audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1, 2A, and 2B.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: obtaining a plurality of training instances for training a sign language captioning model, each of the plurality of training instances including a corresponding training instance output and a corresponding training instance output, the corresponding training instance inputs including at least corresponding sign language feature tokens for a sign language video content segment, and the corresponding training instance outputs including ground truth caption tokens associated with ground truth sign language captions for the sign language video content segment and ground truth timestamp tokens that align the ground truth sign language captions with respect to the sign language video content segment; and training, based on the plurality of training instances, the sign language captioning model. Training the sign language captioning model based on a given training instance, of the plurality of training instances, includes: processing, using the sign language captioning model, at least the corresponding sign language feature tokens for the sign language video content segment, included in the corresponding training instance input for the given training instance, to generate sign language captioning model output; determining, based on the sign language captioning model output, predicted caption tokens associated with predicted sign language captions for the sign language video content segment and predicted timestamp tokens that are predicted to align the predicted sign language captions with respect to the sign language video content segment; generating, based on a comparison of (i) the predicted caption tokens associated with the predicted sign language captions for the sign language video content segment and the ground truth caption tokens associated with the ground truth sign language captions for the sign language video content segment, and/or (ii) the predicted timestamp tokens that are predicted to align the predicted sign language captions with respect to the sign language video content segment and the ground truth timestamp tokens that align the ground truth sign language captions with respect to the sign language video content segment, one or more losses; and updating, based on one or more of the losses, the sign language captioning model. The method further includes, subsequent to training the sign language captioning model: causing the sign language captioning model to be deployed.

These and other implementations of technology disclosed herein can optionally include one or more of the following features.

In some implementations, the corresponding training instance inputs may further include corresponding current caption tokens for current captions from the sign language video content segment.

In additional or alternative implementations, the corresponding training instance inputs may further include corresponding previous caption tokens for previous captions from a previous sign language video content segment that precedes the sign language video content segment.

In additional or alternative implementations, the corresponding training instance inputs may further include corresponding next caption tokens for next captions from a next sign language video content segment that follows the sign language video content segment.

In some versions of those additional or alternative implementations, the corresponding previous caption tokens for the previous captions from the previous sign language video content segment that precedes the sign language video content segment and/or the corresponding next caption tokens for the next captions from the next sign language video content segment that follows the sign language video content segment may condition the processing of the processing of at least the corresponding sign language feature tokens for the sign language video content segment in generating the sign language captioning model output.

In additional or alternative implementations, the corresponding sign language feature tokens for the sign language video content segment comprise one or more of: a corresponding video embedding for the sign language video content segment, corresponding image embeddings for the sign language video content segment, or corresponding vectors for skeletonized versions of the sign language video content segment.

In additional or alternative implementations, the corresponding training instance outputs may further include a ground truth language token associated with a ground truth language for the sign language video content segment.

In some versions of those additional or alternative implementations, the method may further include: determining, based on the sign language captioning model output, a predicted language token associated with a predicted language for the sign language video content segment. Generating one or more of the losses may be further based on a comparison of: (iii) the predicted language token associated with the predicted language for the sign language video content segment and the ground truth language token associated with the ground truth language for the sign language video content segment.

In additional or alternative implementations, the corresponding training instance inputs may further include corresponding instructions for the sign language captioning model to determine the predicted sign language captions for the sign language video content segment and to determine the predicted timestamps that are predicted to align the predicted sign language captions with respect to the sign language video content segment.

In additional or alternative implementations, the method may further include, prior to obtaining the plurality of training instances for training the sign language captioning model: generating the plurality of training instances for training the sign language captioning model.

In some versions of those additional or alternative implementations, generating the given training instance, of the plurality of training instances, may include: obtaining sign language video content that includes a plurality of signs being performed by a user and a caption track for the plurality of signs being performed by the user; segmenting the sign language video content into a plurality of sign language video content segments, the plurality of sign language video content segments including the sign language video content segment for the given training instance, and the sign language video content segment including a corresponding subset of the plurality of signs being performed by the user, in the sign language video content, and a corresponding subset of the caption track for the plurality of signs being performed by the user; determining, based on processing the corresponding subset of the plurality of signs being performed by the user in the sign language video content segment for the given training instance, the corresponding sign language feature tokens for the sign language video content segment and for the given training instance; and determining, based on processing the corresponding subset of the caption track for the plurality of signs being performed by the user in the sign language video content segment for the given training instance, the ground truth caption tokens associated with the ground truth sign language captions for the sign language video content segment and the ground truth timestamp tokens that align the ground truth sign language captions with respect to the sign language video content segment.

In some versions of those additional or alternative implementations, the caption track for the plurality of signs being performed by the user may include corresponding captions associated with the plurality of signs and corresponding caption timestamps for the corresponding captions associated with the plurality of signs.

In some versions of those additional or alternative implementations, one or more of the plurality of sign language video content segments may be overlapping sign language video content segments.

In some versions of those additional or alternative implementations, each of the plurality of sign language video content segments may be a same duration of time that is proportional to a duration of the sign language video content.

In other versions of those additional or alternative implementations, one or more of the plurality of sign language video content segments may be different durations of time.

In some versions of those additional or alternative implementations, the sign language video content may be obtained from a repository of sign language video content that is accessible by a plurality of users.

In other versions of those additional or alternative implementations, the sign language video content may be obtained from a conversation between a given user and an automated assistant, and the corresponding training instance inputs may further include dialog history tokens for a dialog history of the conversation between the given user and the automated assistant.

In additional or alternative implementations, causing the sign language captioning model to be deployed may be in response to determining that one or more conditions are satisfied.

In some versions of those additional or alternative implementations, the one or more conditions may include one or more of: whether the sign language captioning model has been updated based on a threshold quantity of training instances, or whether performance of the sign language captioning model satisfies a threshold quality of performance.

In additional or alternative implementations, causing the sign language captioning model to be deployed may include: identifying newly added sign language video content that is newly added to a repository of sign language video content; processing, using the sign language captioning model, the newly added sign language video content to determine a timestamped caption track associated with the newly added sign language video content; and storing, in association with the newly added sign language video content, the timestamped caption track.

In some versions of those additional or alternative implementations, the method may further include, in response to receiving a request for playback of the newly added sign language video content: causing the timestamped caption track to be played back along with the playback of the newly added sign language video content.

In additional or alternative implementations, causing the sign language captioning model to be deployed may include: identifying an ongoing conversation between a given user of a client device and an automated assistant; processing, using the sign language captioning model, vision data that captures a plurality of sign language signs of a given user that are directed to the automated assistant and a dialog history of the ongoing conversation between the given user and the automated assistant to determine a timestamped caption track associated with the ongoing conversation; and causing the timestamped caption track to be visually rendered for presentation to the given user, via a display of the client device, throughout the ongoing dialog.

In additional or alternative implementations, causing the sign language captioning model to be deployed may include: identifying an ongoing conversation between a given user and an additional user; processing, using the sign language captioning model, vision data that captures a plurality of sign language signs of a given user that are directed to the additional user and a dialog history of the ongoing conversation between the given user and the additional user to determine a timestamped caption track associated with the ongoing conversation; and causing the timestamped caption track to be visually rendered for presentation to the given use and/or the additional user throughout the ongoing dialog.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:

obtaining a plurality of training instances for training a sign language captioning model, each of the plurality of training instances including a corresponding training instance input and a corresponding training instance output, the corresponding training instance inputs including at least corresponding sign language feature tokens for a sign language video content segment, and corresponding alignment indicators that indicate whether ground truth sign language captions for the sign language video content segment are well-aligned or misaligned; and the corresponding training instance outputs including ground truth caption tokens associated with the ground truth sign language captions for the sign language video content segment and ground truth timestamp tokens that align the ground truth sign language captions with respect to the sign language video content segment;

training, based on the plurality of training instances, the sign language captioning model, wherein training the sign language captioning model based on a given training instance, of the plurality of training instances, comprises:

processing, using the sign language captioning model, at least the corresponding sign language feature tokens for the sign language video content segment and the corresponding alignment indicator, included in the corresponding training instance input for the given training instance, to generate sign language captioning model output;

determining, based on the sign language captioning model output, predicted caption tokens associated with predicted sign language captions for the sign language video content segment and predicted timestamp tokens that are predicted to align the predicted sign language captions with respect to the sign language video content segment;

generating, based on a comparison of (i) the predicted caption tokens associated with the predicted sign language captions for the sign language video content segment and the ground truth caption tokens associated with the ground truth sign language captions for the sign language video content segment, and/or (ii) the predicted timestamp tokens that are predicted to align the predicted sign language captions with respect to the sign language video content segment and the ground truth timestamp tokens that align the ground truth sign language captions with respect to the sign language video content segment, one or more losses; and updating, based on one or more of the losses, the sign language captioning model; and subsequent to training the sign language captioning model:

causing the sign language captioning model to be deployed.

2. The method of claim 1, wherein the corresponding training instance inputs further include corresponding current caption tokens for current captions from the sign language video content segment.

3. The method of claim 1, wherein the corresponding training instance inputs further include corresponding previous caption tokens for previous captions from a previous sign language video content segment that precedes the sign language video content segment.

4. The method of claim 1, wherein the corresponding training instance inputs further include corresponding next caption tokens for next captions from a next sign language video content segment that follows the sign language video content segment.

5. The method of claim 1, wherein the corresponding sign language feature tokens for the sign language video content segment comprise one or more of: a corresponding video embedding for the sign language video content segment, corresponding image embeddings for the sign language video content segment, or corresponding vectors for skeletonized representations of the sign language video content segment.

6. The method of claim 1, wherein the corresponding training instance outputs further include a ground truth language token associated with a ground truth language for the sign language video content segment.

7. The method of claim 6, further comprising:

determining, based on the sign language captioning model output, a predicted language token associated with a predicted language for the sign language video content segment, wherein generating one or more of the losses is further based on a comparison of: (iii) the predicted language token associated with the predicted language for the sign language video content segment and the ground truth language token associated with the ground truth language for the sign language video content segment.

8. The method of claim 1, wherein the corresponding training instance inputs further include corresponding instructions for the sign language captioning model to determine the predicted sign language captions for the sign language video content segment and to determine the predicted timestamp tokens that are predicted to align the predicted sign language captions with respect to the sign language video content segment.

9. The method of claim 1, further comprising:

prior to obtaining the plurality of training instances for training the sign language captioning model:

generating the plurality of training instances for training the sign language captioning model.

10. The method of claim 9, wherein generating the given training instance, of the plurality of training instances, comprises:

obtaining sign language video content that includes a plurality of signs being performed by a user and a caption track for the plurality of signs being performed by the user;

segmenting the sign language video content into a plurality of sign language video content segments, the plurality of sign language video content segments including the sign language video content segment for the given training instance, and the sign language video content segment including a corresponding subset of the plurality of signs being performed by the user, in the sign language video content, and a corresponding subset of the caption track for the plurality of signs being performed by the user;

determining, based on processing the corresponding subset of the plurality of signs being performed by the user in the sign language video content segment for the given training instance, the corresponding sign language feature tokens for the sign language video content segment and for the given training instance; and determining, based on processing the corresponding subset of the caption track for the plurality of signs being performed by the user in the sign language video content segment for the given training instance, the ground truth caption tokens associated with the ground truth sign language captions for the sign language video content segment and the ground truth timestamp tokens that align the ground truth sign language captions with respect to the sign language video content segment.

11. The method of claim 10, wherein the caption track for the plurality of signs being performed by the user comprises corresponding captions associated with the plurality of signs and corresponding caption timestamps for the corresponding captions associated with the plurality of signs.

12. The method of claim 1, wherein causing the sign language captioning model to be deployed is in response to determining that one or more conditions are satisfied.

13. The method of claim 12, wherein the one or more conditions comprise one or more of: whether the sign language captioning model has been updated based on a threshold quantity of training instances, or whether performance of the sign language captioning model satisfies a threshold quality of performance.

14. The method of claim 1, wherein causing the sign language captioning model to be deployed comprises:

identifying newly added sign language video content that is newly added to a repository of sign language video content;

processing, using the sign language captioning model, the newly added sign language video content to determine a timestamped caption track associated with the newly added sign language video content; and storing, in association with the newly added sign language video content, the timestamped caption track.

15. The method of claim 14, further comprising:

in response to receiving a request for playback of the newly added sign language video content:

causing the timestamped caption track to be played back along with the playback of the newly added sign language video content.

16. The method of claim 1, wherein causing the sign language captioning model to be deployed comprises:

identifying an ongoing conversation between a given user of a client device and an automated assistant;

processing, using the sign language captioning model, vision data that captures a plurality of sign language signs of the given user that are directed to the automated assistant and a dialog history of the ongoing conversation between the given user and the automated assistant to determine a timestamped caption track associated with the ongoing conversation; and causing the timestamped caption track to be visually rendered for presentation to the given user, via a display of the client device, throughout the ongoing dialog.

17. The method of claim 1, wherein causing the sign language captioning model to be deployed comprises:

identifying an ongoing conversation between a given user and an additional user;

processing, using the sign language captioning model, vision data that captures a plurality of sign language signs of a given user that are directed to the additional user and a dialog history of the ongoing conversation between the given user and the additional user to determine a timestamped caption track associated with the ongoing conversation; and causing the timestamped caption track to be visually rendered for presentation to the given user and/or the additional user throughout the ongoing dialog.

18. A system comprising:

at least one processor; and memory storing instructions that, when executed by the at least one processor, cause the at least one processor to be operable to:

obtain a plurality of training instances for training a sign language captioning model, each of the plurality of training instances including a corresponding training instance input and a corresponding training instance output, the corresponding training instance inputs including at least corresponding sign language feature tokens for a sign language video content segment, and corresponding alignment indicators that indicate whether ground truth sign language captions for the sign language video content segment are well-aligned or misaligned; and the corresponding training instance outputs including ground truth caption tokens associated with the ground truth sign language captions for the sign language video content segment and ground truth timestamp tokens that align the ground truth sign language captions with respect to the sign language video content segment;

train, based on the plurality of training instances, the sign language captioning model, wherein the instructions to train the sign language captioning model based on a given training instance, of the plurality of training instances, comprise instructions to:

process, using the sign language captioning model, at least the corresponding sign language feature tokens for the sign language video content segment and the corresponding alignment indicator, included in the corresponding training instance input for the given training instance, to generate sign language captioning model output;

determine, based on the sign language captioning model output, predicted caption tokens associated with predicted sign language captions for the sign language video content segment and predicted timestamp tokens that are predicted to align the predicted sign language captions with respect to the sign language video content segment;

generate, based on a comparison of (i) the predicted caption tokens associated with the predicted sign language captions for the sign language video content segment and the ground truth caption tokens associated with the ground truth sign language captions for the sign language video content segment, and/or (ii) the predicted timestamp tokens that are predicted to align the predicted sign language captions with respect to the sign language video content segment and the ground truth timestamp tokens that align the ground truth sign language captions with respect to the sign language video content segment, one or more losses; and update, based on one or more of the losses, the sign language captioning model; and subsequent to training the sign language captioning model:

cause the sign language captioning model to be deployed.

19. A non-transitory computer-readable storage medium storing instructions that, when executed by at least one processor, cause the at least one processor to be operable to perform operations, the operations comprising:

obtaining a plurality of training instances for training a sign language captioning model, each of the plurality of training instances including a corresponding training instance input and a corresponding training instance output, the corresponding training instance inputs including at least corresponding sign language feature tokens for a sign language video content segment, and corresponding alignment indicators that indicate whether ground truth sign language captions for the sign language video content segment are well-aligned or misaligned; and the corresponding training instance outputs including ground truth caption tokens associated with the ground truth sign language captions for the sign language video content segment and ground truth timestamp tokens that align the ground truth sign language captions with respect to the sign language video content segment;

training, based on the plurality of training instances, the sign language captioning model, wherein training the sign language captioning model based on a given training instance, of the plurality of training instances, comprises:

processing, using the sign language captioning model, at least the corresponding sign language feature tokens for the sign language video content segment and the corresponding alignment indicator, included in the corresponding training instance input for the given training instance, to generate sign language captioning model output;

determining, based on the sign language captioning model output, predicted caption tokens associated with predicted sign language captions for the sign language video content segment and predicted timestamp tokens that are predicted to align the predicted sign language captions with respect to the sign language video content segment;

generating, based on a comparison of (i) the predicted caption tokens associated with the predicted sign language captions for the sign language video content segment and the ground truth caption tokens associated with the ground truth sign language captions for the sign language video content segment, and/or (ii) the predicted timestamp tokens that are predicted to align the predicted sign language captions with respect to the sign language video content segment and the ground truth timestamp tokens that align the ground truth sign language captions with respect to the sign language video content segment, one or more losses; and updating, based on one or more of the losses, the sign language captioning model; and subsequent to training the sign language captioning model:

causing the sign language captioning model to be deployed.

* * * * *